(12) United States Patent
Ando

(10) Patent No.: US 8,234,029 B2
(45) Date of Patent: Jul. 31, 2012

(54) HYBRID VEHICLE AND CONTROL METHOD OF HYBRID VEHICLE

(75) Inventor: Ikuo Ando, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 622 days.

(21) Appl. No.: 12/444,615

(22) PCT Filed: Aug. 23, 2007

(86) PCT No.: PCT/JP2007/066355
§ 371 (c)(1),
(2), (4) Date: Apr. 7, 2009

(87) PCT Pub. No.: WO2008/050530
PCT Pub. Date: May 2, 2008

(65) Prior Publication Data
US 2010/0082188 A1    Apr. 1, 2010

(30) Foreign Application Priority Data
Oct. 25, 2006  (JP) .................................. 2006-290278

(51) Int. Cl.
*B60L 9/00* (2006.01)
*B60W 10/00* (2006.01)
(52) U.S. Cl. ..................................... 701/22; 180/65.265
(58) Field of Classification Search .................. None
See application file for complete search history.

(56) References Cited

U.S. PATENT DOCUMENTS

| 2005/0042151 | A1* | 2/2005 | Alward et al. | 422/177 |
| 2009/0120699 | A1* | 5/2009 | Suzuki et al. | 180/65.265 |

FOREIGN PATENT DOCUMENTS

| JP | 09-039613 A | 2/1997 |
| JP | 11-082093 A | 3/1999 |
| JP | 2002-130001 A | 5/2002 |
| JP | 2002-285878 A | 10/2002 |
| JP | 2003-333705 A | 11/2003 |
| JP | 2004-036626 A | 2/2004 |
| JP | 2004-143939 A | 5/2004 |
| JP | 2004-197703 A | 7/2004 |
| JP | 2004-197707 A | 7/2004 |
| JP | 2006-083776 A | 3/2006 |

* cited by examiner

*Primary Examiner* — Thomas Tarcza
*Assistant Examiner* — Nagi Murshed
(74) *Attorney, Agent, or Firm* — Kenyon & Kenyon LLP

(57) ABSTRACT

On a restart of an engine accompanied with a change from a motor drive of a hybrid vehicle to a hybrid drive, when a temperature of a catalyst in a catalytic converter located in an exhaust pipe of the engine decreases below a preset reference temperature to be out of a specific temperature range of ensuring sufficient catalyst performance, a power restriction value is set according to the catalyst temperature and an EV drive time representing a time duration of the motor drive. An engine power demand to be output from the engine is set under output restriction with this power restriction value. The engine and two motors are then controlled with the set engine power demand. This arrangement effectively prevents poor emission and ensures good driving performance of the vehicle even in the event of a temperature decrease of the catalyst by the motor drive of the vehicle.

20 Claims, 11 Drawing Sheets

HYBRID VEHICLE AND CONTROL METHOD OF HYBRID VEHICLE

This is a 371 national phase application of PCT/JP2007/066355 filed 23 Aug. 2007, claiming priority to Japanese Patent Application No. JP 2006-290278 filed 25 Oct. 2006, the contents of which are incorporated herein by reference.

TECHNICAL FIELD

The present invention relates to a hybrid vehicle and a control method of the hybrid vehicle. More specifically the invention pertains to a hybrid vehicle driven with output power of a motor and with output power of an internal combustion engine equipped with a catalytic converter located in an exhaust pipe and filled with a catalyst having capacity for reducing the toxicity of exhaust gas, as well as to a control method of such a hybrid vehicle.

BACKGROUND ART

One proposed configuration of a hybrid vehicle includes an engine, a planetary gear mechanism connected with an output shaft of the engine and with an axle of the vehicle, a generator linked to the planetary gear mechanism, and a motor arranged to output power to the axle. The hybrid vehicle of this proposed configuration is drivable with only the output power of the motor in the state of operation stop of the engine (see, for example, Patent Document 1). During a motor drive of this prior art hybrid vehicle with the operation of the engine stopped, the generator is controlled to apply a load to the engine and thereby prevent discharge of the air to a catalytic converter, which is located in an exhaust system of the engine and used to reduce the toxicity of exhaust gas. This aims to prevent deterioration of a catalyst in the catalytic converter.
Patent Document 1: Japanese Patent Laid-Open No. 2002-130001

DISCLOSURE OF THE INVENTION

In the configuration of this prior art hybrid vehicle, a relatively long time duration of the motor drive may cause the temperature of the catalyst to significantly decrease at a time of restarting the operation of the engine. In order to ensure the sufficient performance of the catalyst having the capacity of reducing the toxicity of exhaust gas, it is generally required to control the temperature of the catalyst in a specific performance-ensuring temperature range. When the motor drive decreases the temperature of the catalyst below a lower limit temperature of the specific performance-ensuring temperature range, the catalyst does not have the sufficient performance immediately after a restart of engine operation and causes the poor emission. One possible measure against this problem is catalyst warm-up operation of the engine without applying a load onto the engine until the temperature of the catalyst increases to the specific performance-ensuring temperature range. This measure, however, results in power insufficiency and failed output of the driver's required driving force, thus significantly lowering the vehicle driving performance.

In the hybrid vehicle and the control method of the hybrid vehicle, there would thus be a demand for preventing poor emission even in the event of a temperature decrease of a catalyst by a motor drive of the vehicle. In the hybrid vehicle and the control method of the hybrid vehicle, there would also be a demand for ensuring good driving performance of the vehicle even in the event of a temperature decrease of the catalyst by the motor drive of the vehicle.

The present invention accomplishes at least part of the demands mentioned above and the other relevant demands by the following configurations applied to the hybrid vehicle and the control method of the hybrid vehicle.

According to one aspect, the invention is directed to a first hybrid vehicle driven with output power of a motor and with output power of an internal combustion engine equipped with a catalytic converter located in an exhaust pipe and filled with a catalyst having a capacity for reducing the toxicity of exhaust gas. In the first hybrid vehicle of this aspect, a driving force demand setting module sets a driving force demand required for driving the hybrid vehicle. When a catalyst temperature decrease condition of decreasing temperature the catalyst is not satisfied on a restart of operation of the internal combustion engine or on an engine operation restart after a motor drive of the hybrid vehicle driven with only the output power of the motor in a state of operation stop of the internal combustion engine, a target power setting module sets a target power to be output from the internal combustion engine based on the set driving force demand. When the catalyst temperature decrease condition is satisfied on the engine operation restart, the target power setting module sets the target power to be output from the internal combustion engine based on the set driving force demand with a predetermined output restriction, until fulfillment of a specified return condition. After fulfillment of the specified return condition, the target power setting module releases the predetermined output restriction and sets the target power to be output from the internal combustion engine based on the set driving force demand. In the state of operation stop of the internal combustion engine, a controller controls the internal combustion engine and the motor to drive the hybrid vehicle with a driving force equivalent to the set driving force demand with the internal combustion engine kept stopping. In a state of operation of the internal combustion engine, the controller controls the internal combustion engine and the motor to cause the set target power to be output from the internal combustion engine and to drive the hybrid vehicle with the driving force equivalent to the set driving force demand.

In the first hybrid vehicle according to this aspect of the invention, when the catalyst temperature decrease condition of decreasing the temperature of the catalyst included in the catalytic converter located in the exhaust pipe of the internal combustion engine is not satisfied on the restart of operation of the internal combustion engine or on the engine operation restart after the motor drive of the hybrid vehicle with only the output power of the motor in the state of operation stop of the internal combustion engine, the target power to be output from the internal combustion engine is set based on the driving force demand required for driving the hybrid vehicle. The internal combustion engine and the motor are then controlled to cause the set target power to be output from the internal combustion engine and to drive the hybrid vehicle with the driving force equivalent to the set driving force demand. When the temperature of the catalyst is in a specific temperature range of ensuring sufficient catalyst performance, there is no poor emission. The target power to be output from the internal combustion engine is accordingly set based on the driving force demand required for driving the hybrid vehicle, and the internal combustion engine and the motor are controlled to cause the set target power to be output from the internal combustion engine. This arrangement ensures the good vehicle driving performance without causing the poor emission. When the catalyst temperature decrease condition is satisfied on the engine operation restart, the target power to be output from the internal combustion engine is set based on the driving force demand with the predetermined output restriction, until fulfillment of the specified return condition. The internal combustion engine and the motor are then controlled to cause the set target power to be output from the internal combustion engine and to drive the hybrid vehicle with the driving force equivalent to the set driving force demand. When the temperature of the catalyst decreases below the specific temperature range of ensuring sufficient catalyst performance, there is poor emission. The target power is accordingly set with the predetermined output restriction, and the internal combustion engine and the motor are controlled to cause the set target power to be output from the internal combustion engine. The configuration of setting the target power with the predetermined output restriction and controlling the operation of the internal combustion engine effectively prevents the poor emission, compared with the conventional configuration of setting the target power without imposing any output restriction and controlling the operation of the internal combustion engine. The control of the internal combustion engine to output the target power desirably ensures the good vehicle driving performance, compared with the simple catalyst warm-up operation of the internal combustion engine. Even when the catalyst temperature decrease condition is satisfied on the engine operation restart, after fulfillment of the specified return condition, the target power to be output from the internal combustion engine is set based on the driving force demand with release of the predetermined output restriction. The internal combustion engine and the motor are then controlled to cause the set target power to be output from the internal combustion engine and to drive the hybrid vehicle with the driving force equivalent to the set driving force demand. When the temperature of the catalyst reaches the specific temperature range of ensuring sufficient catalyst performance, there is no poor emission. The predetermined output condition is accordingly released. This arrangement ensures the good vehicle driving performance without causing the poor emission.

In one preferable embodiment of the invention, the first hybrid vehicle further has a motor drive switch located near to a driver's seat of the hybrid vehicle and operated to give an instruction for the motor drive. On the engine operation restart in an off condition of the motor drive switch, the target power setting module sets the target power to be output from the internal combustion engine based on the set driving force demand, irrespective of fulfillment or failure of the catalyst temperature decrease condition. Only when the catalyst temperature decrease condition is satisfied on the engine operation restart in an on condition of the motor drive switch, the target power is set with the predetermined output restriction, until fulfillment of the specified return condition. The on condition of the motor drive switch naturally causes the longer time duration of the motor drive, compared with the off condition of the motor drive switch. This arrangement adequately deals with such situations.

In one preferable application of the first hybrid vehicle according to the above aspect of the invention, the predetermined output restriction has a tendency of imposing a stronger restriction with a decrease in temperature of the catalyst. This is based on the fact that the lower temperature of the catalyst results in the poorer emission. In another preferable application of the first hybrid vehicle according to the above aspect of the invention, the predetermined output restriction has a tendency of imposing a stronger restriction with an increase in time duration of the motor drive immediately before a restart of the operation of the internal combustion engine. This is based on the fact that the longer time duration of the motor drive leads to the lower temperature of the catalyst. The predetermined output restriction may impose a restriction on an upper limit of power output from the internal combustion engine.

In one preferable application of the first hybrid vehicle according to the above aspect of the invention, the catalyst temperature decrease condition is that the temperature of the catalyst is lower than a first temperature, and the specified return condition is that the temperature of the catalyst is not lower than a second temperature that is higher than the first temperature. The first temperature may be set equal to or close to a lower limit temperature in the specific temperature range of ensuring sufficient catalyst performance. The second temperature is higher than the first temperature by a preset temperature difference, for example, 30° C., 50° C., or 70° C.

In another preferable application of the first hybrid vehicle according to the above aspect of the invention, the catalyst temperature decrease condition is that the motor drive continues for or over a first time period, and the specified return condition is that a second time period has elapsed or a predetermined distance has been driven since a restart of the operation of the internal combustion engine. The first time may be set arbitrarily, for example, 2 minutes, 3 minutes, or 5 minutes. The second time may be set arbitrarily, for example, 1 minute or 2 minutes. The predetermined distance may be any suitable distance, for example, 1 km, 2 km, or 5 km.

The first hybrid vehicle according to the above aspect of the invention may further include an electric power-mechanical power input output assembly connected with a driveshaft linked to an axle of the hybrid vehicle and with an output shaft of the internal combustion engine in such a manner as to be rotatable independently of the driveshaft and configured to input and output power to and from the driveshaft and the internal combustion engine through input and output of electric power and mechanical power. In this case, The electric power-mechanical power input output assembly may has: a three shaft-type power input output structure connected to three shafts, the driveshaft, the output shaft, and a third shaft, and designed to input and output power to a residual shaft based on powers input from and output to any two shafts among the three shafts; and a generator arranged to input and output power from and to the third shaft.

According to another aspect, the invention is also directed to a second hybrid vehicle driven with output power of a motor and with output power of an internal combustion engine equipped with a catalytic converter located in an exhaust pipe and filled with a catalyst having a capacity for reducing the toxicity of exhaust gas. In the second hybrid vehicle of this aspect, when a catalyst temperature decrease condition of decreasing temperature of the catalyst is not satisfied on a restart of operation of the internal combustion engine or on an engine operation restart after a motor drive of the hybrid vehicle driven with only the output power of the motor in a state of operation stop of the internal combustion engine, a driving force demand setting module sets a driving force demand required for driving the hybrid vehicle in a preset constraint. When the catalyst temperature decrease condition is satisfied on the engine operation restart, the driving force demand setting module sets the driving force demand in the preset constraint with a predetermined output restriction, until fulfillment of a specified return condition. After fulfillment of the specified return condition, the driving force demand setting module releases the predetermined output restriction and sets the driving force demand in the preset constraint. A controller controls the internal combustion engine and the motor to drive the hybrid vehicle with a driving force equivalent to the set driving force demand accompanied with intermittent operation of the internal combustion engine.

In the second hybrid vehicle according to this aspect of the invention, when the catalyst temperature decrease condition of decreasing the temperature of the catalyst included in the catalytic converter located in the exhaust pipe of the internal combustion engine is not satisfied on the restart of operation of the internal combustion engine or on the engine operation restart after the motor drive of the hybrid vehicle with only the output power of the motor in the state of operation stop of the internal combustion engine, the driving force demand required for driving the hybrid vehicle is set in the preset constraint. The internal combustion engine and the motor are then controlled to drive the hybrid vehicle with the driving force equivalent to the set driving force demand. When the temperature of the catalyst is in the specific temperature range of ensuring sufficient catalyst performance, there is no poor emission. The driving force demand required for driving the hybrid vehicle is accordingly set in the preset constraint, and the internal combustion engine and the motor are controlled to drive the hybrid vehicle with the driving force equivalent to the set driving force demand. This arrangement ensures the good vehicle driving performance without causing the poor emission. When the catalyst temperature decrease condition is satisfied on the engine operation restart, the driving force demand is set in the preset constraint with the predetermined output restriction, until fulfillment of the specified return condition. The internal combustion engine and the motor are then controlled to drive the hybrid vehicle with the driving force equivalent to the set driving force demand. When the temperature of the catalyst decreases below the specific temperature range of ensuring sufficient catalyst performance, there is poor emission. The driving force demand is accordingly set with the predetermined output restriction, and the internal combustion engine and the motor are controlled to drive the hybrid vehicle with the driving force equivalent to the set driving force demand. Setting the driving force demand with the predetermined output restriction imposes a restriction on the output from the internal combustion engine driven with the set driving force demand. This arrangement effectively prevents the poor emission, compared with the conventional configuration of setting the driving force demand without imposing any output restriction. The control of the internal combustion engine based on the set driving force demand with the predetermined output restriction desirably ensures the good vehicle driving performance, compared with the simple catalyst warm-up operation of the internal combustion engine. Even when the catalyst temperature decrease condition is satisfied on the engine operation restart, after fulfillment of the specified return condition, the driving force demand is set in the preset constraint with release of the predetermined output restriction. The internal combustion engine and the motor are then controlled to drive the hybrid vehicle with the driving force equivalent to the set driving force demand. When the temperature of the catalyst reaches the specific temperature range of ensuring sufficient catalyst performance, there is no poor emission. The control is accordingly returned to the ordinary control operation. This arrangement ensures the good vehicle driving performance without causing the poor emission.

In one preferable embodiment of the invention, the second hybrid vehicle further has a motor drive switch located near to a driver's seat of the hybrid vehicle and operated to give an instruction for the motor drive. On the engine operation restart in an off condition of the motor drive switch, the driving force demand setting module sets the driving force demand in the preset constraint, irrespective of fulfillment or failure of the catalyst temperature decrease condition. Only when the catalyst temperature decrease condition is satisfied on the engine operation restart in an on condition of the motor drive switch, the driving force is set with the predetermined output restriction, until fulfillment of the specified return condition. The on condition of the motor drive switch naturally causes the longer time duration of the motor drive, compared with the off condition of the motor drive switch. This arrangement adequately deals with such situations.

In one preferable application of the second hybrid vehicle according to the above aspect of the invention, the predetermined output restriction has a tendency of imposing a stronger restriction with a decrease in temperature of the catalyst. This is based on the fact that the lower temperature of the catalyst results in the poorer emission. In another preferable application of the second hybrid vehicle according to the above aspect of the invention, the predetermined output restriction has a tendency of imposing a stronger restriction with an increase in time duration of the motor drive immediately before a restart of the operation of the internal combustion engine. This is based on the fact that the longer time duration of the motor drive leads to the lower temperature of the catalyst. The predetermined output restriction may impose a restriction on an upper limit of power output from the internal combustion engine.

In one preferable application of the second hybrid vehicle according to the above aspect of the invention, the catalyst temperature decrease condition is that the temperature of the catalyst is lower than a first temperature, and the specified return condition is that the temperature of the catalyst is not lower than a second temperature that is higher than the first temperature. The first temperature may be set equal to or close to a lower limit temperature in the specific temperature range of ensuring sufficient catalyst performance. The second temperature is higher than the first temperature by a preset temperature difference, for example, 30° C., 50° C., or 70° C.

In another preferable application of the second hybrid vehicle according to the above aspect of the invention, the catalyst temperature decrease condition is that the motor drive continues for or over a first time period, and the specified return condition is that a second time period has elapsed or a predetermined distance has been driven since a restart of the operation of the internal combustion engine. The first time may be set arbitrarily, for example, 2 minutes, 3 minutes, or 5 minutes. The second time may be set arbitrarily, for example, 1 minute or 2 minutes. The predetermined distance may be any suitable distance, for example, 1 km, 2 km, or 5 km.

The second hybrid vehicle according to the above aspect of the invention may further include an electric power-mechanical power input output assembly connected with a driveshaft linked to an axle of the hybrid vehicle and with an output shaft of the internal combustion engine in such a manner as to be rotatable independently of the driveshaft and configured to input and output power to and from the driveshaft and the internal combustion engine through input and output of electric power and mechanical power. In this case, the electric power-mechanical power input output assembly may has: a three shaft-type power input output structure connected to three shafts, the driveshaft, the output shaft, and a third shaft, and designed to input and output power to a residual shaft based on powers input from and output to any two shafts among the three shafts; and a generator arranged to input and output power from and to the third shaft.

According to another aspect, the invention is also directed to a first control method of a hybrid vehicle driven with output power of a motor and with output power of an internal combustion engine equipped with a catalytic converter located in an exhaust pipe and filled with a catalyst having a capacity for reducing the toxicity of exhaust gas, the control method including: (a) when a catalyst temperature decrease condition of decreasing temperature of the catalyst is not satisfied on a restart of operation of the internal combustion engine or on an engine operation restart after a motor drive of the hybrid vehicle driven with only the output power of the motor in a state of operation stop of the internal combustion engine, setting a target power to be output from the internal combustion engine based on a driving force demand required for driving the hybrid vehicle, and when the catalyst temperature decrease condition is satisfied on the engine operation restart, setting the target power to be output from the internal combustion engine based on the driving force demand with a predetermined output restriction, until fulfillment of a specified return condition, and after fulfillment of the specified return condition, releasing the predetermined output restriction and setting the target power to be output from the internal combustion engine based on the driving force demand. The method further includes: (b) in the state of operation stop of the internal combustion engine, controlling the internal combustion engine and the motor to drive the hybrid vehicle with a driving force equivalent to the driving force demand with the internal combustion engine kept stopping, while in a state of operation of the internal combustion engine, controlling the internal combustion engine and the motor to cause the set target power to be output from the internal combustion engine and to drive the hybrid vehicle with the driving force equivalent to the driving force demand.

In the first control method according to this aspect of the invention, when the catalyst temperature decrease condition of decreasing the temperature of the catalyst included in the catalytic converter located in the exhaust pipe of the internal combustion engine is not satisfied on the restart of operation of the internal combustion engine or on the engine operation restart after the motor drive of the hybrid vehicle with only the output power of the motor in the state of operation stop of the internal combustion engine, the target power to be output from the internal combustion engine is set based on the driving force demand required for driving the hybrid vehicle. The internal combustion engine and the motor are then controlled to cause the set target power to be output from the internal combustion engine and to drive the hybrid vehicle with the driving force equivalent to the set driving force demand. When the temperature of the catalyst is in a specific temperature range of ensuring sufficient catalyst performance, there is no poor emission. The target power to be output from the internal combustion engine is accordingly set based on the driving force demand required for driving the hybrid vehicle, and the internal combustion engine and the motor are controlled to cause the set target power to be output from the internal combustion engine. This arrangement ensures the good vehicle driving performance without causing the poor emission. When the catalyst temperature decrease condition is satisfied on the engine operation restart, the target power to be output from the internal combustion engine is set based on the driving force demand with the predetermined output restriction, until fulfillment of the specified return condition. The internal combustion engine and the motor are then controlled to cause the set target power to be output from the internal combustion engine and to drive the hybrid vehicle with the driving force equivalent to the set driving force demand. When the temperature of the catalyst decreases below the specific temperature range of ensuring sufficient catalyst performance, there is poor emission. The target power is accordingly set with the predetermined output restriction, and the internal combustion engine and the motor are controlled to cause the set target power to be output from the internal combustion engine. The configuration of setting the target power with the predetermined output restriction and controlling the operation of the internal combustion engine effectively prevents the poor emission, compared with the conventional configuration of setting the target power without imposing any output restriction and controlling the operation of the internal combustion engine. The control of the internal combustion engine to output the target power desirably ensures the good vehicle driving performance, compared with the simple catalyst warm-up operation of the internal combustion engine. Even when the catalyst temperature decrease condition is satisfied on the engine operation restart, after fulfillment of the specified return condition, the target power to be output from the internal combustion engine is set based on the driving force demand with release of the predetermined output restriction. The internal combustion engine and the motor are then controlled to cause the set target power to be output from the internal combustion engine and to drive the hybrid vehicle with the driving force equivalent to the set driving force demand. When the temperature of the catalyst reaches the specific temperature range of ensuring sufficient catalyst performance, there is no poor emission. The predetermined output condition is accordingly released. This arrangement ensures the good vehicle driving performance without causing the poor emission.

According to still another aspect, the invention is also directed to a second control method of a hybrid vehicle driven with output power of a motor and with output power of an internal combustion engine equipped with a catalytic converter located in an exhaust pipe and filled with a catalyst having a capacity for reducing the toxicity of exhaust gas, the control method including: (a) when a catalyst temperature decrease condition of decreasing temperature of the catalyst is not satisfied on a restart of operation of the internal combustion engine or on an engine operation restart after a motor drive of the hybrid vehicle driven with only the output power of the motor in a state of operation stop of the internal combustion engine, setting a driving force demand required for driving the hybrid vehicle in a preset constraint, and when the catalyst temperature decrease condition is satisfied on the engine operation restart, setting the driving force demand in the preset constraint with a predetermined output restriction, until fulfillment of a specified return condition, and after fulfillment of the specified return condition, releasing the predetermined output restriction and setting the driving force demand in the preset constraint. The method further includes: (b) controlling the internal combustion engine and the motor to drive the hybrid vehicle with a driving force equivalent to the set driving force demand accompanied with intermittent operation of the internal combustion engine.

In the second control method according to this aspect of the invention, when the catalyst temperature decrease condition of decreasing the temperature of the catalyst included in the catalytic converter located in the exhaust pipe of the internal combustion engine is not satisfied on the restart of operation of the internal combustion engine or on the engine operation restart after the motor drive of the hybrid vehicle with only the output power of the motor in the state of operation stop of the internal combustion engine, the driving force demand required for driving the hybrid vehicle is set in the preset constraint. The internal combustion engine and the motor are then controlled to drive the hybrid vehicle with the driving force equivalent to the set driving force demand. When the temperature of the catalyst is in the specific temperature range of ensuring sufficient catalyst performance, there is no poor emission. The driving force demand required for driving the hybrid vehicle is accordingly set in the preset constraint, and the internal combustion engine and the motor are controlled to drive the hybrid vehicle with the driving force equivalent to the set driving force demand. This arrangement ensures the good vehicle driving performance without causing the poor emission. When the catalyst temperature decrease condition is satisfied on the engine operation restart, the driving force demand is set in the preset constraint with the predetermined output restriction, until fulfillment of the specified return condition. The internal combustion engine and the motor are then controlled to drive the hybrid vehicle with the driving force equivalent to the set driving force demand. When the temperature of the catalyst decreases below the specific temperature range of ensuring sufficient catalyst performance, there is poor emission. The driving force demand is accordingly set with the predetermined output restriction, and the internal combustion engine and the motor are controlled to drive the hybrid vehicle with the driving force equivalent to the set driving force demand. Setting the driving force demand with the predetermined output restriction imposes a restriction on the output from the internal combustion engine driven with the set driving force demand. This arrangement effectively prevents the poor emission, compared with the conventional configuration of setting the driving force demand without imposing any output restriction. The control of the internal combustion engine based on the set driving force demand with the predetermined output restriction desirably ensures the good vehicle driving performance, compared with the simple catalyst warm-up operation of the internal combustion engine. Even when the catalyst temperature decrease condition is satisfied on the engine operation restart, after fulfillment of the specified return condition, the driving force demand is set in the preset constraint with release of the predetermined output restriction. The internal combustion engine and the motor are then controlled to drive the hybrid vehicle with the driving force equivalent to the set driving force demand. When the temperature of the catalyst reaches the specific temperature range of ensuring sufficient catalyst performance, there is no poor emission. The control is accordingly returned to the ordinary control operation. This arrangement ensures the good vehicle driving performance without causing the poor emission.

BEST MODES OF CARRYING OUT THE INVENTION

Figure 1:
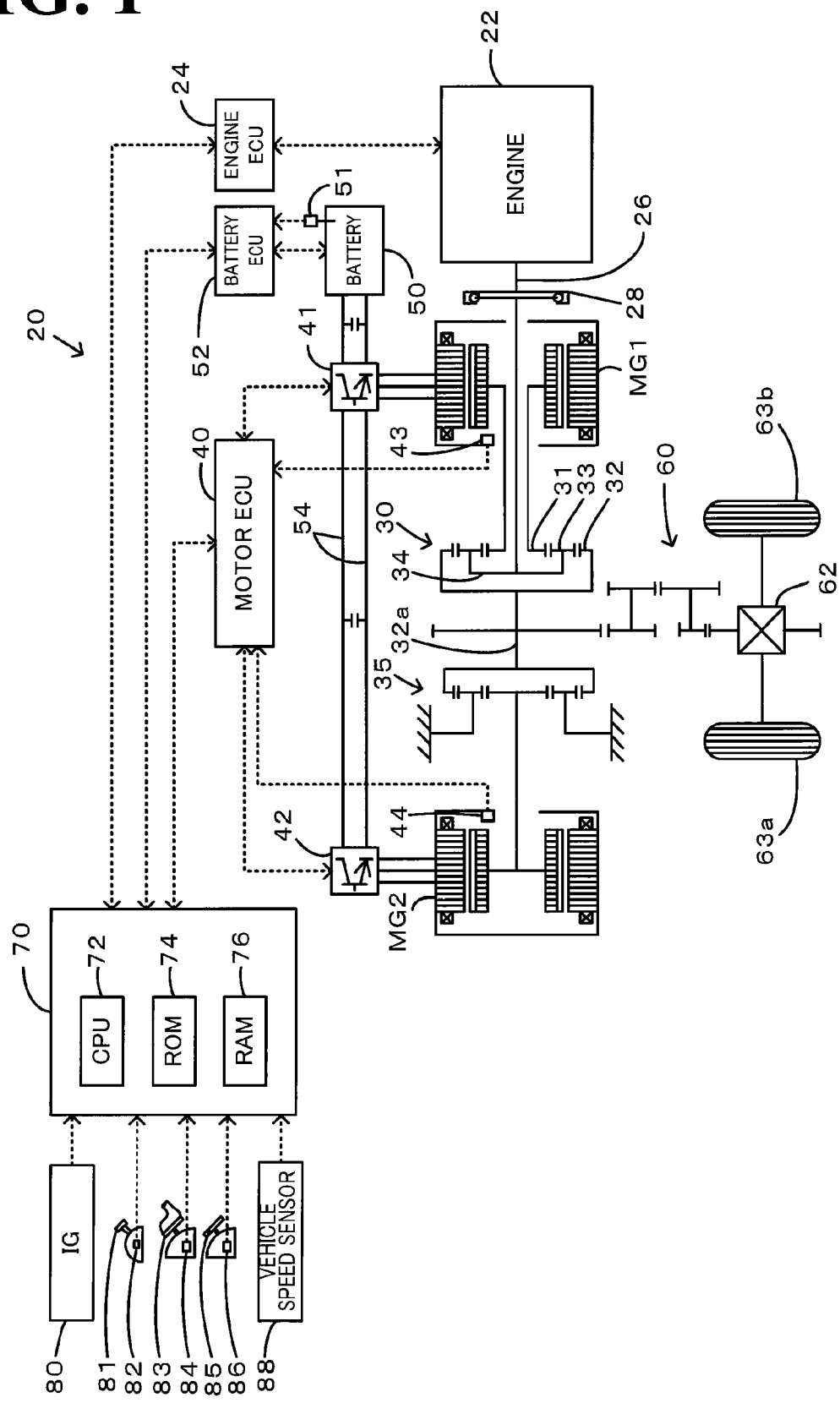
FIG. 1 schematically illustrates the configuration of a hybrid vehicle 20 according to a first embodiment of the invention.

Some modes of carrying out the invention are described below as preferred embodiments. FIG. 1 schematically illustrates the configuration of a hybrid vehicle 20 according to a first embodiment of the invention. As illustrated, the hybrid vehicle 20 of the first embodiment includes the engine 22, a three shaft-type power distribution integration mechanism 30 connected via a damper 28 to a crankshaft 26 or an output shaft of the engine 22, a motor MG1 connected to the power distribution integration mechanism 30 and designed to have power generation capability, a reduction gear 35 attached to a ring gear shaft 32a or a driveshaft linked with the power distribution integration mechanism 30, a motor MG2 connected to the reduction gear 35, and a hybrid electronic control unit 70 configured to control the operations of the whole hybrid vehicle 20.

Figure 2:
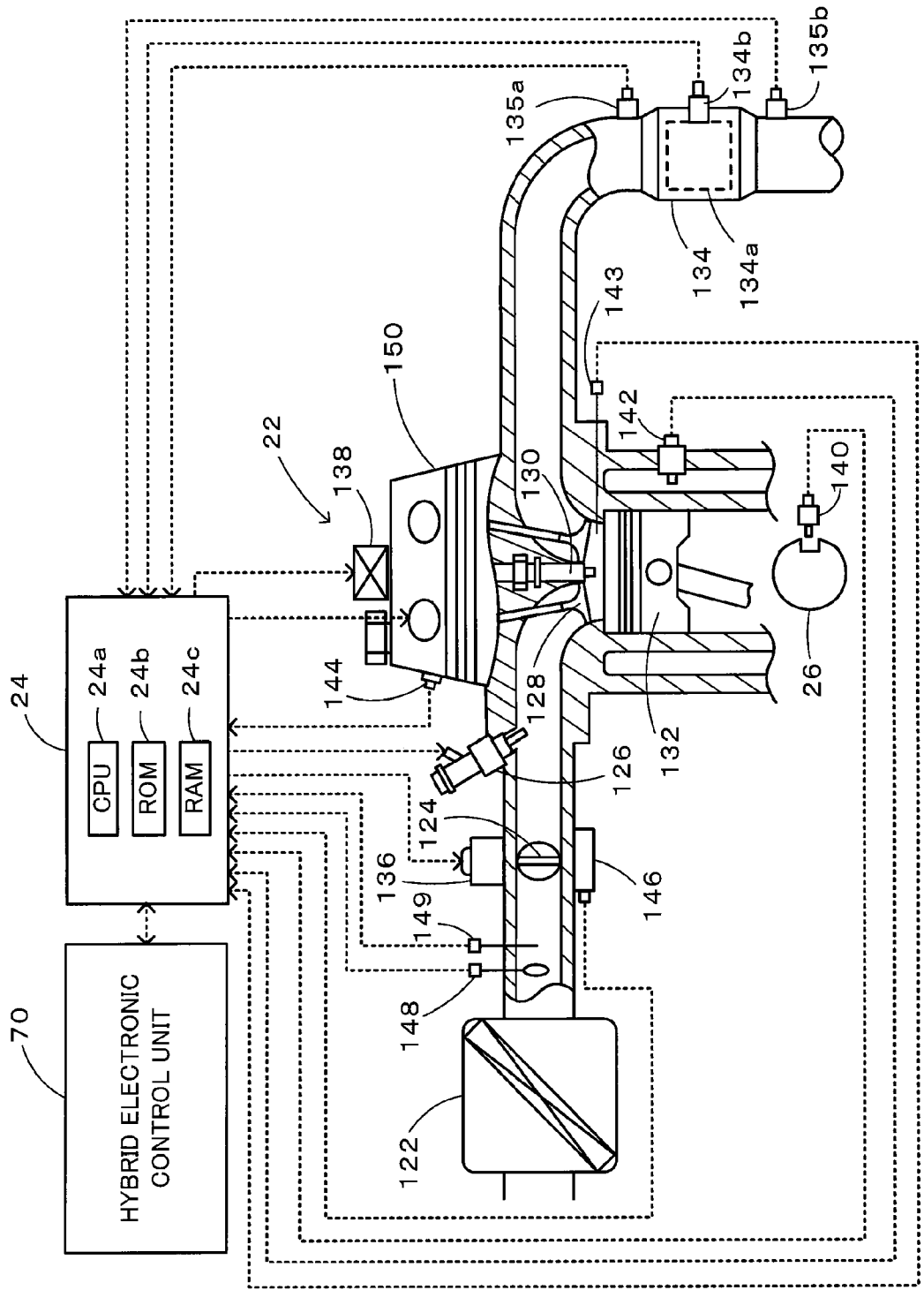
FIG. 2 schematically illustrates the configuration of an engine 22.

The engine 22 is an internal combustion engine that consumes a hydrocarbon fuel, such as gasoline or light oil, to output power. As shown in FIG. 2, the air cleaned by an air cleaner 122 and taken in via a throttle valve 124 is mixed with the atomized gasoline injected by a fuel injection valve 126 to the air-fuel mixture. The air-fuel mixture is introduced into a combustion chamber via an intake valve 128. The introduced air-fuel mixture is ignited with spark made by a spark plug 130 to be explosively combusted. The reciprocating motions of a piston 132 by the combustion energy are converted into rotational motions of a crankshaft 23. The exhaust from the engine 22 goes through a catalytic conversion unit 134 (filled with three-way catalyst) to convert toxic components included in the exhaust, that is, carbon monoxide (CO), hydrocarbons (HC), and nitrogen oxides (NOx), into harmless components, and is discharged to the outside air.

The engine 22 is under control of an engine electronic control unit 24 (hereafter referred to as engine ECU 24). The engine ECU 24 is constructed as a microprocessor including a CPU 24a, a ROM 24b that stores processing programs, a RAM 24c that temporarily stores data, input and output ports (not shown), and a communication port (not shown). The engine ECU 24 receives, via its input port (not shown), signals from various sensors that measure and detect the conditions of the engine 22. The signals input into the engine ECU 24 include a crank position from a crank position sensor 140 detected as the rotational position of the crankshaft 23, a cooling water temperature from a water temperature sensor 142 measured as the temperature of cooling water in the engine 22, an in-cylinder pressure Pin from a pressure sensor 143 located inside the combustion chamber, a cam position from a cam position sensor 144 detected as the rotational position of a camshaft driven to open and close the intake valve 128 and an exhaust valve for gas intake and exhaust into and from the combustion chamber, a throttle valve position from a throttle valve position sensor 146 detected as the opening or position of the throttle valve 124, an air flow meter signal AF from an air flow meter 148 attached to an air intake conduit, an intake air temperature from a temperature sensor 149 attached to the air intake conduit, a catalyst temperature Tc from a catalyst temperature sensor 134b in a catalytic converter 134, and an air/fuel ratio AF from an air/fuel ratio sensor 135a, and an oxygen signal from an oxygen sensor 135b. The engine ECU 24 outputs, via its output port, diverse control signals and driving signals to drive and control the engine 22, for example, driving signals to the fuel injection valve 126, driving signals to a throttle valve motor 136 for regulating the position of the throttle valve 124, control signals to an ignition coil 138 integrated with an igniter, and control signals to a variable valve timing mechanism 150 to vary the open and close timings of the intake valve 128. The engine ECU 24 communicates with the hybrid electronic control unit 70. The engine ECU 24 receives control signals from the hybrid electronic control unit 70 to drive and control the engine 22, while outputting data regarding the driving conditions of the engine 22 to the hybrid electronic control unit 70 according to the requirements. The engine ECU calculates a rotation speed of the crankshaft 26 or a rotation speed Ne of the engine 22 based on the crank position input from the crank position sensor 140.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50. The battery ECU 52 also calculates input and output limits Win and Wout of the battery 50 as input and output limits of charge/discharge of the battery 50 based on the state of charge (SOC) of the battery 50 and the battery temperature Tb of the battery 50 detected by the temperature sensor 51.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a. The torque conversion drive mode is equivalent to one state of the charge-discharge drive mode without charge or discharge of the battery 50 and is thus regarded as part of the charge-discharge drive mode.

Figure 3:
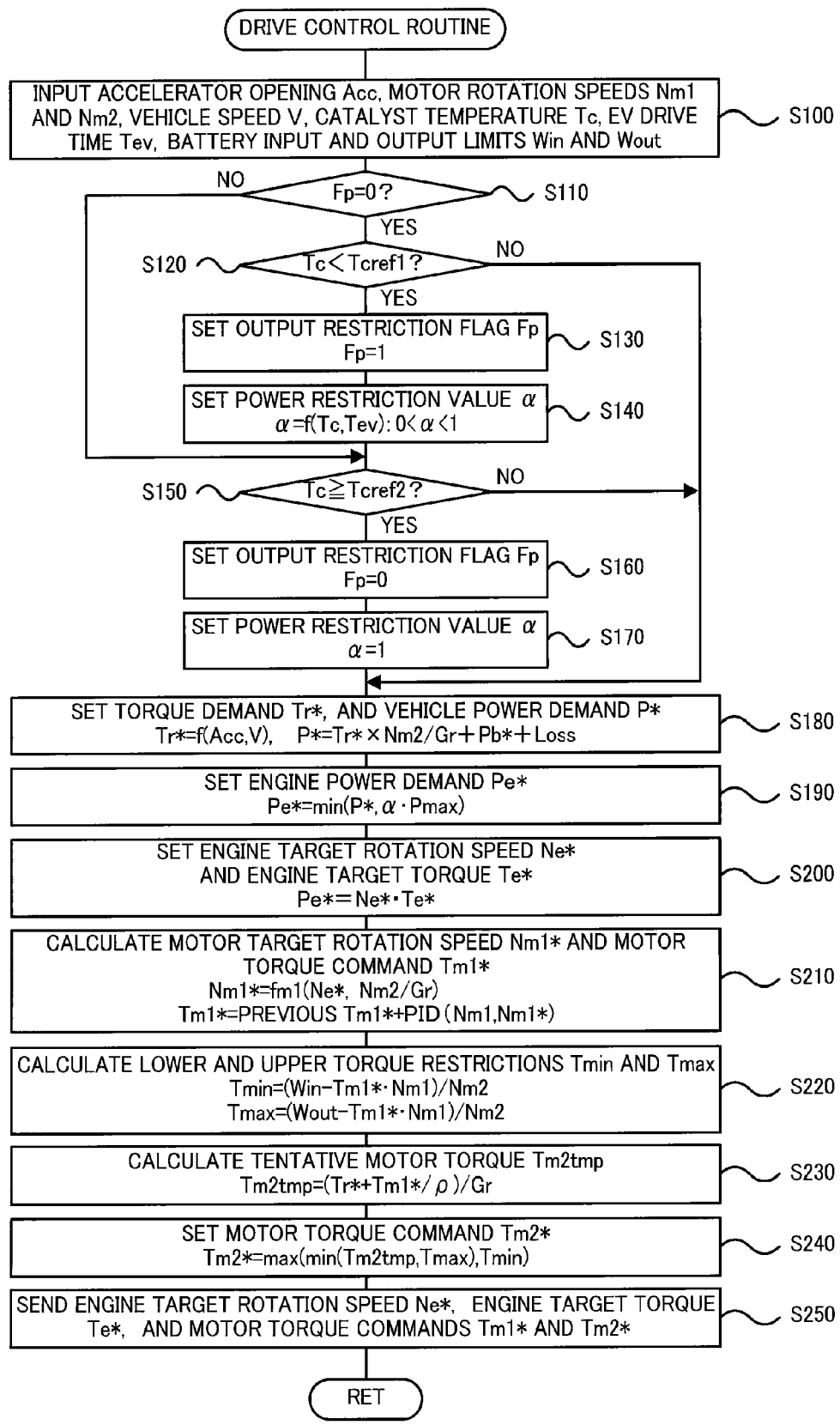
FIG. 3 is a flowchart showing a drive control routine executed by a hybrid electronic control unit 70 in response to a change from a motor drive to hybrid drive.

The following describes the operations of the hybrid vehicle 20 of the first embodiment having the configuration discussed above, especially a series of operations in response to a change from a motor drive of the hybrid vehicle 20 driven in the motor drive mode with only the output power of the motor MG2 in operation stop of the engine 22 to a hybrid drive of the hybrid vehicle 20 driven in the charge-discharge drive mode with a start of the engine 22. FIG. 3 is a drive control routine executed by the hybrid electronic control unit 70 in response to a change from the motor drive to the hybrid drive. This drive control routine is performed repeatedly at preset time intervals (for example, at every several msec). In the state of operation stop of the engine 22, the hybrid electronic control unit 70 performs a motor drive routine (not shown) and controls the engine 22 and the motors MG1 and MG2 to ensure output of a torque demand Tr*, which is set based on the accelerator opening Acc and the vehicle speed V according to a torque demand setting map of FIG. 6 as discussed later, from the motor MG2 to the ring gear shaft 32a or the driveshaft.

In the drive control routine, the CPU 72 of the hybrid electronic control unit 70 first inputs various data required for control, for example, the accelerator opening Acc from the accelerator pedal position sensor 84, the vehicle speed V from the vehicle speed sensor 88, rotation speeds Nm1 and Nm2 of the motors MG1 and MG2, the catalyst temperature Tc, an EV drive time Tev, and the input limit Win and the output limit Wout of the battery 50 (step S100). The rotation speeds Nm1 and Nm2 of the motors MG1 and MG2 are computed from the rotational positions of the rotors in the motors MG1 and MG2 detected by the rotational position detection sensors 43 and 44 and are input from the motor ECU 40 by communication. The catalyst temperature Tc is detected by the catalyst temperature sensor 134b and is input from the engine ECU 24 by communication. The input limit Win and the output limit Wout of the battery 50 are set based on the battery temperature Tb and the state of charge (SOC) of the battery 50 and are input from the battery ECU 52 by communication. The EV drive time Tev is counted by a timer (not shown) as a time duration of the motor drive immediately before a change to the hybrid drive.

The CPU 72 subsequently identifies the value of an output restriction flag Fp (step S110). The output restriction flag Fp represents a requirement for output restriction in response to a decrease in temperature of the catalyst 134a in the catalytic converter 134 below a lower limit temperature in a specific temperature range of ensuring the sufficient catalyst performance by the motor drive of the hybrid vehicle 20. The output restriction flag Fp is set in this drive control routine. In a first cycle of the drive control routine immediately after a start of the engine 22, the output restriction flag Fp is set equal to 0 as an initial value. It is assumed that the temperature of the catalyst 134a is significantly low at the timing immediately after a start of the engine 22 when the output restriction flag Fp is equal to 0.

Figure 4:
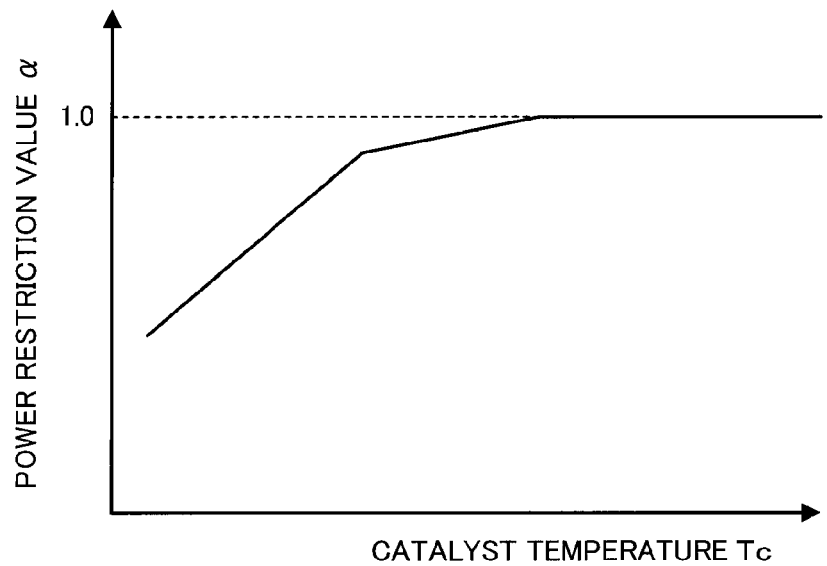
FIG. 4 shows one example of relation of a power restriction value α to a catalyst temperature Tc.
Figure 5:
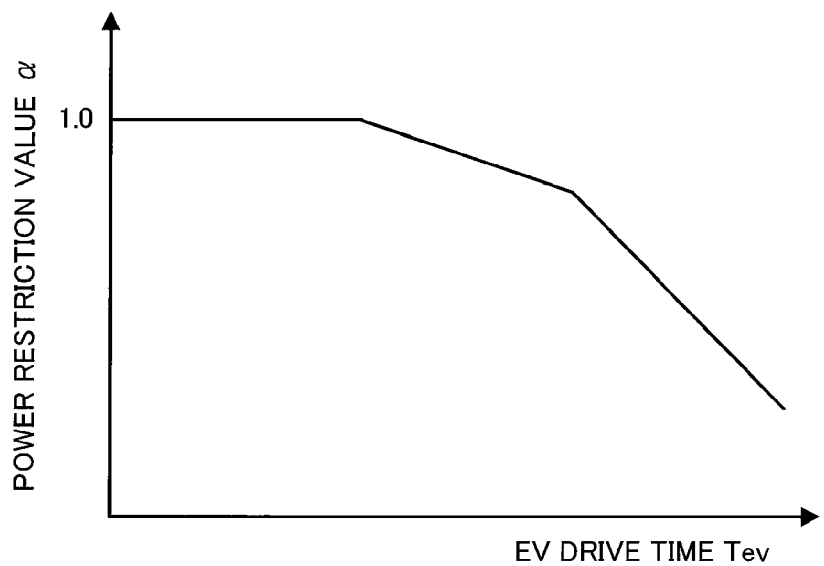
FIG. 5 shows one example of relation of the power restriction value α to an EV drive time Tev.

Upon identification of the output restriction flag Fp equal to 0, it is determined whether the catalyst temperature Tc is lower than a preset reference temperature Tcref1 (step S120). The reference temperature Tcref1 is used as a criterion for determining whether the temperature of the catalyst 134a in the catalytic converter 134 is within the specific temperature range of ensuring the sufficient catalyst performance and is set equal to or close to the lower limit temperature of the specific temperature range. Since the catalyst 134a has the low temperature at this moment, it is determined that the catalyst temperature Tc is lower than the reference temperature Tcref1. In response to such determination, the CPU 72 sets the output restriction flag Fp to 1 (step S130), and sets a power restriction value α based on the input catalyst temperature Tc and the input EV drive time Tev (step S140). The power restriction value α represents a correction factor to be multiplied to a maximum possible power Pmax output from the engine 22 with a view to restricting the output power of the engine 22. The power restriction value α is set in a value range of 0 to 1 and decreases with a decrease in catalyst temperature Tc and with an increase in EV drive time Tev. A concrete procedure of setting the power restriction value α in the first embodiment provides and stores in advance a variation in power restriction value α against the catalyst temperature Tc and a variation in power restriction value α against the EV drive time Tev as a power restriction value setting map in the ROM 74 and reads the power restriction value α corresponding to the given catalyst temperature Tc and the given EV drive time Tev from this map. One example of the relation of the power restriction value α to the catalyst temperature Tc is shown in FIG. 4, and one example of the relation of the power restriction value α to the EV drive time Tev is shown in FIG. 5. In the first cycle of the drive control routine immediately after a start of the engine 22, the power restriction value α is set equal to 1 representing no output restriction as an initial value.

Figure 6:
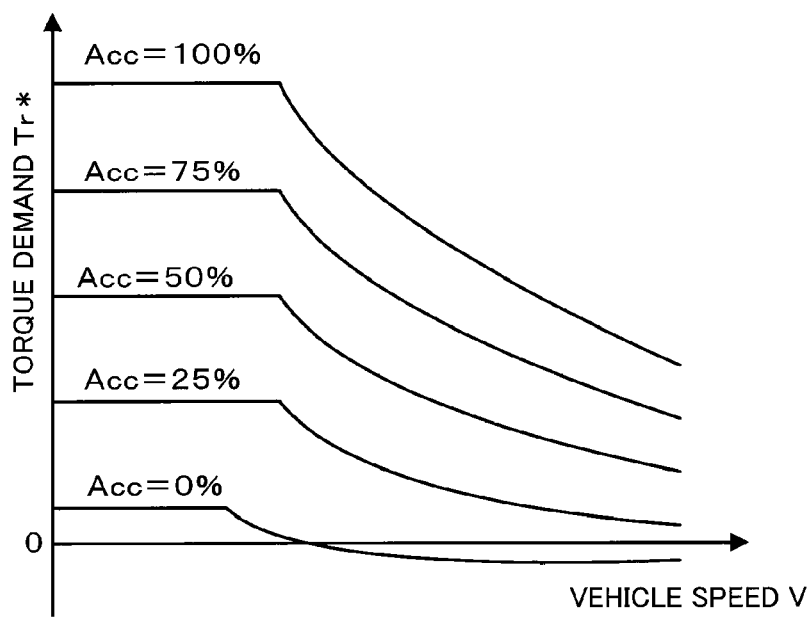
FIG. 6 shows one example of a torque demand setting map.

The catalyst temperature Tc is subsequently compared with a preset reference temperature Tcref2 that is set to be slightly higher than the reference temperature Tcref1 (for example, higher by about 50° C.) (step S150). Since the catalyst 134a has the low temperature at this moment, it is determined that the catalyst temperature Tc is lower than the preset reference temperature Tcref2. In response to such determination, the CPU 72 sets a torque demand Tr* to be output to the ring gear shaft 32a or the driveshaft linked with the drive wheels 63a and 63b as a torque required for the vehicle and a vehicle power demand P* required for the vehicle, based on the input accelerator opening Acc and the input vehicle speed V (step S180). A concrete procedure of setting the torque demand Tr* in the first embodiment provides and stores in advance variations in torque demand Tr* against the vehicle speed V with regard to various settings of the accelerator opening Acc as a torque demand setting map in the ROM 74 and reads the torque demand Tr* corresponding to the given accelerator opening Acc and the given vehicle speed V from this torque demand setting map. One example of the torque demand setting map is shown in FIG. 6. The vehicle power demand P* is calculated as the sum of the product of the set torque demand Tr* and a rotation speed Nr of the ring gear shaft 32a, a charge-discharge power demand Pb* to be charged into or discharged from the battery 50, and a potential loss. The rotation speed Nr of the ring gear shaft 32a is obtained by multiplying the vehicle speed V by a preset conversion factor k or by dividing the rotation speed Nm2 of the motor MG2 by a gear ratio Gr of the reduction gear 35.

Figure 7:
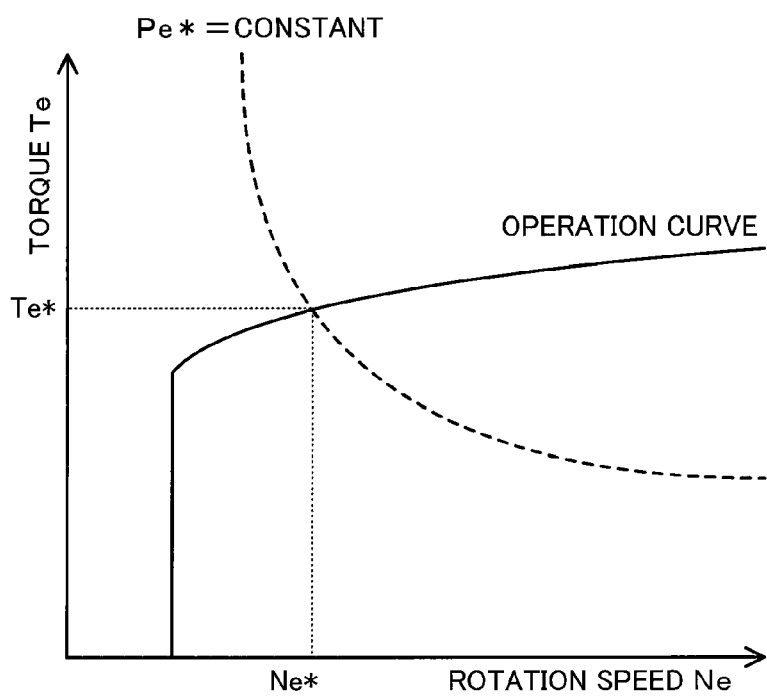
FIG. 7 shows one example of an operation curve of the engine 22 used to set a target rotation speed Ne* and a target torque Te*.

The smaller between the set vehicle power demand P* and the product of the maximum possible power Pmax output from the engine 22 and the power restriction value α is set to an engine power demand Pe* (step S190). A target drive point of the engine 22 specified by a combination of a target rotation speed Ne* and a target torque Te* is subsequently set, based on the set engine power demand Pe* (step S200). The engine power demand Pe* set in this manner is restricted according to the catalyst temperature Tc and the EV drive time Tev. The target drive point of the engine 22 is set according to an operation curve of ensuring efficient operation of the engine 22 and a curve of the engine power demand Pe*. FIG. 7 shows one example of the operation curve of the engine 22 used to set the target rotation speed Ne* and the target torque Te*. As clearly shown in FIG. 7, the target rotation speed Ne* and the target torque Te* are given as an intersection of the operation curve and a curve of constant engine power demand Pe* (=Ne*×Te*).

Figure 8:
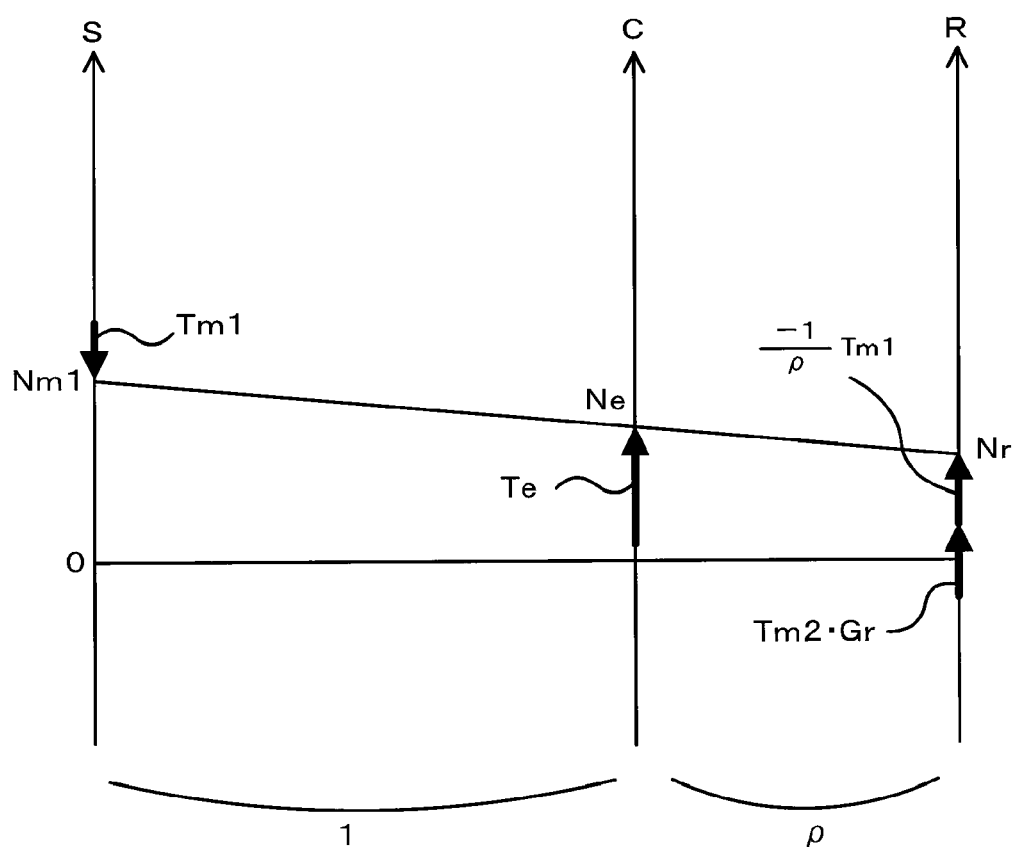
FIG. 8 is an alignment chart showing torque-rotation speed dynamics of respective rotational elements included in power distribution integration mechanism 30.

The CPU 72 subsequently calculates a target rotation speed Nm1* of the motor MG1 from the target rotation speed Ne* of the engine 22, the rotation speed Nr (=Nm2/Gr) of the ring gear shaft 32a, and a gear ratio ρ of the power distribution integration mechanism 30 according to Equation (1) given below, while calculating a torque command Tm1* of the motor MG1 from the calculated target rotation speed Nm1* and the current rotation speed Nm1 of the motor MG1 according to Equation (2) given below (step S210). Equation (1) is a dynamic relational expression of respective rotational elements included in the power distribution integration mechanism 30. FIG. 8 is an alignment chart showing torque-rotation speed dynamics of the respective rotational elements included in the power distribution integration mechanism 30. The left axis 'S' represents a rotation speed of the sun gear 31 that is equivalent to the rotation speed Nm1 of the motor MG1. The middle axis 'C' represents a rotation speed of the carrier 34 that is equivalent to the rotation speed Ne of the engine 22. The right axis 'R' represents the rotation speed Nr of the ring gear 32 obtained by dividing the rotation speed Nm2 of the motor MG2 by the gear ratio Gr of the reduction gear 35. Equation (1) is readily introduced from this alignment chart. Two thick arrows on the axis 'R' respectively show a torque applied to the ring gear shaft 32a by output of the torque Tm1 from the motor MG1, and a torque applied to the ring gear shaft 32a via the reduction gear 35 by output of the torque Tm2 from the motor MG2. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term.

$$Nm1^* = Ne^* \cdot (1+\rho)/\rho - Nm2/(Gr \cdot \rho) \quad (1)$$

$$Tm1^* = \text{previous } Tm1^* + k1(Nm1^*-Nm1) + k2\int(Nm1^*-Nm1)dt \quad (2)$$

After calculation of the target rotation speed Nm1* and the torque command Tm1* of the motor MG1, the CPU 72 calculates a lower torque restriction Tmin and an upper torque restriction Tmax as allowable minimum and maximum torques output from the motor MG2 according to Equations (3) and (4) given below (step S220). The lower torque restriction Tmin and the upper torque restriction Tmax are obtained by dividing respective differences between the input limit Win or the output limit Wout of the battery 50 and power consumption (power generation) of the motor MG1, which is the product of the calculated torque command Tm1* and the current rotation speed Nm1 of the motor MG1, by the current rotation speed Nm2 of the motor MG2. The CPU 72 then calculates a tentative motor torque Tm2tmp to be output from the motor MG2 from the torque demand Tr*, the torque command Tm1* of the motor MG1, and the gear ratio ρ of the power distribution integration mechanism 30, according to Equation (5) given below (step S230). The CPU 72 then limits the calculated tentative motor torque Tm2tmp by the lower and the upper torque restrictions Tmin and Tmax to set a torque command Tm2* of the motor MG2 (step S240). Setting the torque command Tm2* of the motor MG2 in this manner restricts the torque demand Tr* to be output to the ring gear shaft 32a or the driveshaft in the range of the input limit Win and the output limit Wout of the battery 50. Equation (5) is readily introduced from the alignment chart of FIG. 8.

$$Tmin = (Win - Tm1^* \cdot Nm1)/Nm2 \quad (3)$$

$$Tmax = (Wout - Tm1^* \cdot Nm1)/Nm2 \quad (4)$$

$$Tm2tmp = (Tr^* + Tm1^*/\rho)/Gr \quad (5)$$

After setting the target rotation speed Ne* and the target torque Te* of the engine 22 and the torque commands Tm1* and Tm2* of the motors MG1 and MG2, the CPU 72 sends the target rotation speed Ne* and the target torque Te* of the engine 22 to the engine ECU 24 and the torque commands Tm1* and Tm2* of the motors MG1 and MG2 to the motor ECU 40 (step S250) and exits from the drive control routine. The engine ECU 24 receives the settings of the target rotation speed Ne* and the target torque Te* and performs required controls of the engine 22, such as fuel injection control and ignition control, to drive the engine 22 at the target drive point specified by the combination of the target rotation speed Ne* and the target torque Te*. The motor ECU 40 receives the settings of the torque commands Tm1* and Tm2* and performs switching control of switching elements included in the respective inverters 41 and 42 to drive the motor MG1 with the torque command Tm1* and the motor MG2 with the torque command Tm2*.

The first cycle of the drive control routine follows this flow described above when the catalyst 134a has the low temperature immediately after a start of the engine 22. In subsequent cycles of the drive control routine, it is identified at step S110 that the output restriction flag Fp is equal to 1. Until the catalyst temperature Tc increases to or above the reference temperature Tcref2, the operation control of the engine 22 and the motors MG1 and MG2 is performed with the engine power demand Pe* set under the output restriction with the power restriction value α set according to the catalyst temperature Tc and the EV drive time immediately after a start of the engine 22.

When the catalyst temperature Tc reaches or exceeds the reference temperature Tcref2 through the repeated operation control of the engine 22 and the motors MG1 and MG2 with the engine power demand Pe* under the output restriction, the CPU 72 resets the output restriction flag Fp to 0 (step S160) and sets the power restriction value α to 1 (step S170). The drive control routine subsequently performs the processing of and after step S180 with the power restriction value α set equal to 1 and is terminated. In this state, ordinary drive control starts in release of the output restriction that is triggered by the temperature decrease of the catalyst 134a below the lower limit temperature in the specific temperature range of ensuring the sufficient catalyst performance.

On the condition of the sufficient high catalyst temperature Tc of the catalyst 134a immediately after a start of the engine 22, that is, when the catalyst temperature Tc is not lower than the reference temperature Tcref1 in the first cycle of the drive control routine after a start of the engine 22, the engine power demand Pe* is set with the power restriction value α set to the initial value 1 representing no output restriction. The processing of and after step S180 is then performed with this engine power demand Pe* to control the operations of the engine 22 and the motors MG1 and MG2.

In the hybrid vehicle 20 of the first embodiment described above, when the catalyst 134a has the significantly low catalyst temperature Tc and is expected to have only the poor catalyst performance immediately after a start of the engine 22 accompanied with a change from the motor drive to the hybrid drive, the engine power demand Pe* is set with the output restriction. The operation control of the engine 22 and the motors MG1 and MG2 is then performed with this engine power demand Pe*. Such drive control with the output restriction effectively prevents the poor emission compared with the conventional drive control without imposing the output restriction, while ensuring the good vehicle driving performance compared with the simple catalyst warm-up operation of the engine 22. The output restriction is imposed with the power restriction value α set according to the catalyst temperature Tc and the EV drive time Tev. This arrangement ensures the adequate output restriction based on the catalyst temperature Tc and the EV drive time Tev. When the catalyst temperature Tc reaches or exceeds the reference temperature Tcref2 through the repeated operation control of the engine 22 and the motors MG1 and MG2 with the engine power demand Pe* set under the output restriction, there is no poor emission. The operation control of the engine 22 and the motors MG1 and MG2 (ordinary drive control) is then performed with the engine power demand Pe* set in release of the output restriction. This arrangement promptly ensures the good vehicle driving performance without causing the poor emission. When the temperature of the catalyst 134a is in the specific temperature range of ensuring the sufficient catalyst performance immediately after a start of the engine 22 accompanied with a change from the motor drive to the hybrid drive, there is no poor emission. The engine power demand Pe* is accordingly set without imposing the output restriction, and the operation control of the engine 22 and the motors MG1 and MG2 is performed with this engine power demand Pe*. This arrangement ensures the good vehicle driving performance without causing the poor emission.

In the hybrid vehicle 20 of the first embodiment, the power restriction value α is set according to both the catalyst temperature Tc and the EV drive time Tev. The power restriction value α may alternatively be set according to only the catalyst temperature Tc or according to only the EV drive time Tev. The power restriction value α may otherwise be set to a fixed value (for example, 0.7), independently of the catalyst temperature Tc and the EV drive time Tev.

In the hybrid vehicle 20 of the first embodiment, the output restriction is imposed with setting the smaller between the vehicle power demand P* and the product of the maximum possible power Pmax output from the engine 22 and the power restriction value α to the engine power demand Pe*. The output restriction may be imposed with setting the product of the vehicle power demand P* and the power restriction value α to the engine power demand Pe*.

In the hybrid vehicle 20 of the first embodiment, the output restriction is imposed with the power restriction value α when the catalyst temperature Tc detected immediately after a start of the engine 22 accompanied with a change from the motor drive to the hybrid drive is lower than the reference temperature Tcref1. The output restriction is released when the subsequently detected catalyst temperature Tc reaches or exceeds the reference temperature Tcref2. In one modification, the output restriction may be released after elapse of a preset time (for example, 1 minute or 2 minutes) since the start of the output restriction.

In the hybrid vehicle 20 of the first embodiment, the output restriction is imposed with the power restriction value α when the catalyst temperature Tc detected immediately after a start of the engine 22 accompanied with a change from the motor drive to the hybrid drive is lower than the reference temperature Tcref1. The output restriction is released when the subsequently detected catalyst temperature Tc reaches or exceeds the reference temperature Tcref2. In one modified configuration of the hybrid vehicle, a motor drive switch for giving an instruction of the motor drive may be provided in the neighborhood of the driver's seat. In an ON condition of the motor drive switch, the output restriction is imposed with the power restriction value α when the catalyst temperature Tc detected immediately after a start of the engine 22 accompanied with a change from the motor drive to the hybrid drive is lower than the reference temperature Tcref1. The output restriction is released when the subsequently detected catalyst temperature Tc reaches or exceeds the reference temperature Tcref2. In an OFF condition of the motor drive switch, the output restriction with the power restriction value α is not performed, irrespective of the catalyst temperature Tc detected immediately after a start of the engine 22 accompanied with a change from the motor drive to the hybrid drive.

Figure 9:
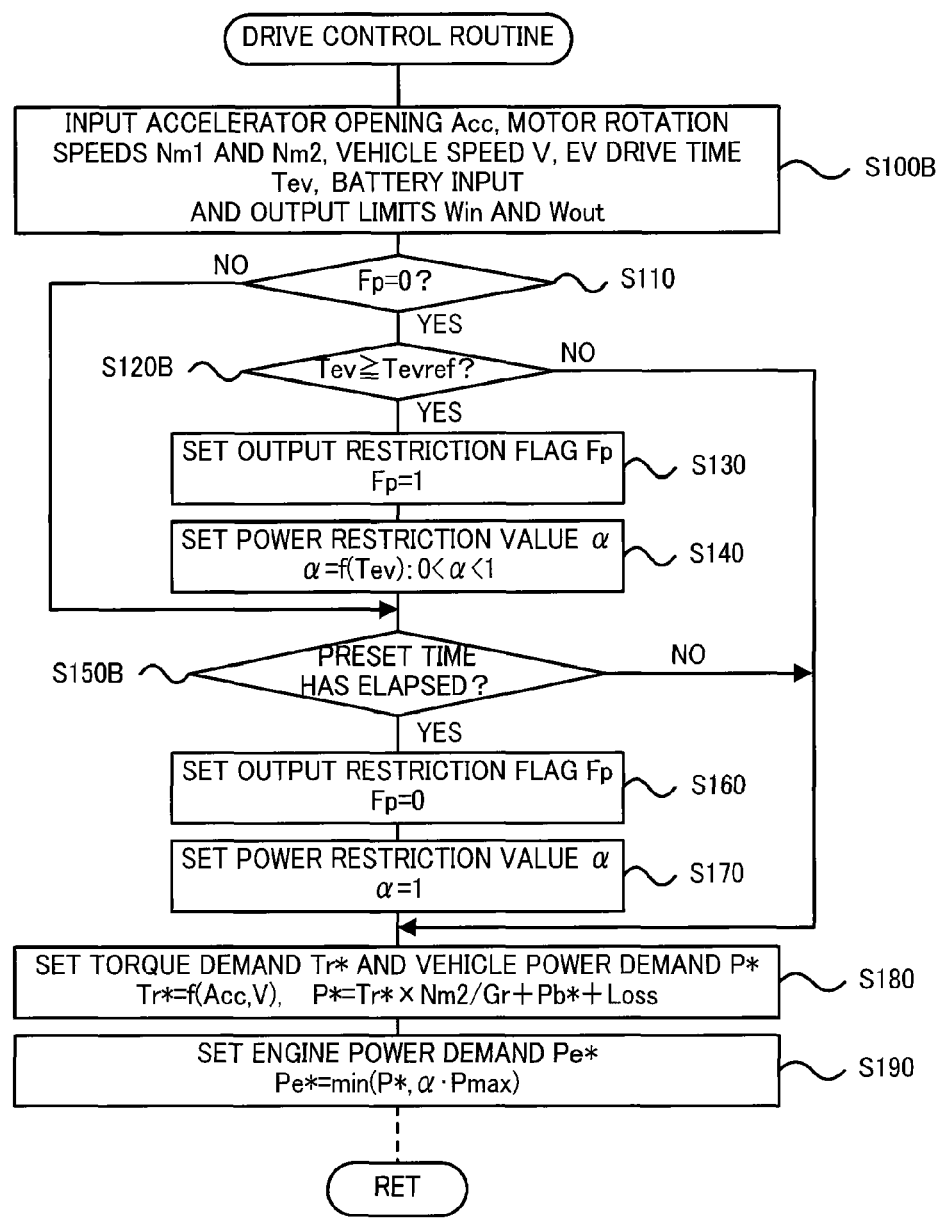
FIG. 9 is a flowchart showing a modified drive routine.

In the hybrid vehicle 20 of the first embodiment, the catalytic converter 134 is equipped with the catalyst temperature sensor 134b. The output restriction is imposed with the power restriction value α when the catalyst temperature Tc detected by the catalyst temperature sensor 134b immediately after a start of the engine 22 accompanied with a change from the motor drive to the hybrid drive is lower than the reference temperature Tcref1. The output restriction is released when the catalyst temperature Tc subsequently detected by the catalyst temperature sensor 134b reaches or exceeds the reference temperature Tcref2. The hybrid vehicle of one modified configuration may not have the catalyst temperature sensor 134b and may impose the output restriction with the power restriction value α according to the EV drive time Tev and release the output restriction according to a time elapsed since the start of the output restriction. In the hybrid vehicle of this modified configuration, a modified drive control routine of FIG. 9 is performed in place of the drive control routine of FIG. 3. The modified drive control routine of FIG. 9 inputs the similar data required for control except the catalyst temperature Tc (step S100B) and compares the input EV drive time Tev with a preset reference time Tevref (for example, 3 minutes or 4 minutes) (step S120B) upon identification of the output restriction flag Fp equal to 0. When the EV drive time Tev is not longer than the reference time Tevref, it is assumed that the catalyst 134a is in the state of poor catalyst performance. The modified drive control routine then sets the power restriction value α according to the EV drive time Tev (steps S130 and S140) and performs the operation control of the engine 22 and the motors MG1 and MG2 with the engine power demand Pe* set under the output restriction. It is then determined whether a preset time (for example, 1 minute or 2 minutes) has been elapsed since the start of the output restriction (step S150B). On elapse of the preset time, it is assumed that the catalyst 134a is in the state of sufficient catalyst performance. The modified drive control routine then releases the output restriction (steps S160 and S170) and performs the operation control of the engine 22 and the motors MG1 and MG2 (ordinary drive control) with the engine power demand Pe* without imposing the output restriction. This modified drive control is based on the fact that the longer EV drive time as the time duration of the motor drive results in decreasing the catalyst temperature Tc of the catalyst 134a. This modified arrangement also prevents the poor emission and ensures the good vehicle driving performance.

A hybrid vehicle 20B is described below as a second embodiment according to the invention. The hybrid vehicle 20B of the second embodiment has the identical hardware configuration with that of the hybrid vehicle 20 of the first embodiment. In order to avoid the duplicated explanation, the like hardware components in the hybrid vehicle 20B of the second embodiment to those in the hybrid vehicle 20 of the first embodiment are expressed by the like numerals and symbols and are not specifically described here. In the hybrid vehicle 20B of the second embodiment, in response to a change from the motor drive to the hybrid drive, the hybrid electronic control unit 70 executes a drive control routine of FIG. 10, in place of the drive control routine of FIG. 3. In the hybrid vehicle 20B of the second embodiment, in the state of operation stop of the engine 22, the hybrid electronic control unit 70 also performs a motor drive routine (not shown) and controls the engine 22 and the motors MG1 and MG2 to ensure output of a torque demand Tr*, which is set based on the accelerator opening Acc and the vehicle speed V according to the torque demand setting map of FIG. 6 as discussed later, from the motor MG2 to the ring gear shaft 32a or the driveshaft As in the drive control routine of FIG. 3 discussed above, in the drive control routine of FIG. 10, the CPU 72 of the hybrid electronic control unit 70 first inputs various data required for control, for example, the accelerator opening Acc from the accelerator pedal position sensor 84, the vehicle speed V from the vehicle speed sensor 88, the rotation speeds Nm1 and Nm2 of the motors MG1 and MG2, the catalyst temperature Tc, the EV drive time Tev, and the input limit Win and the output limit Wout of the battery 50 (step S300). The CPU 72 subsequently identifies the value of a drive restriction flag Ft (step S310). Like the output restriction flag Fp, the drive restriction flag Ft represents a requirement for drive restriction in response to a decrease in temperature of the catalyst 134a in the catalytic converter 134 below a lower limit temperature in a specific temperature range of ensuring the sufficient catalyst performance by the motor drive of the hybrid vehicle 20. The drive restriction flag Ft is set in this drive control routine. It is assumed that the temperature of the catalyst 134a is significantly low at the timing immediately after a start of the engine 22 when the drive restriction flag Ft is equal to 0.

Figure 11:
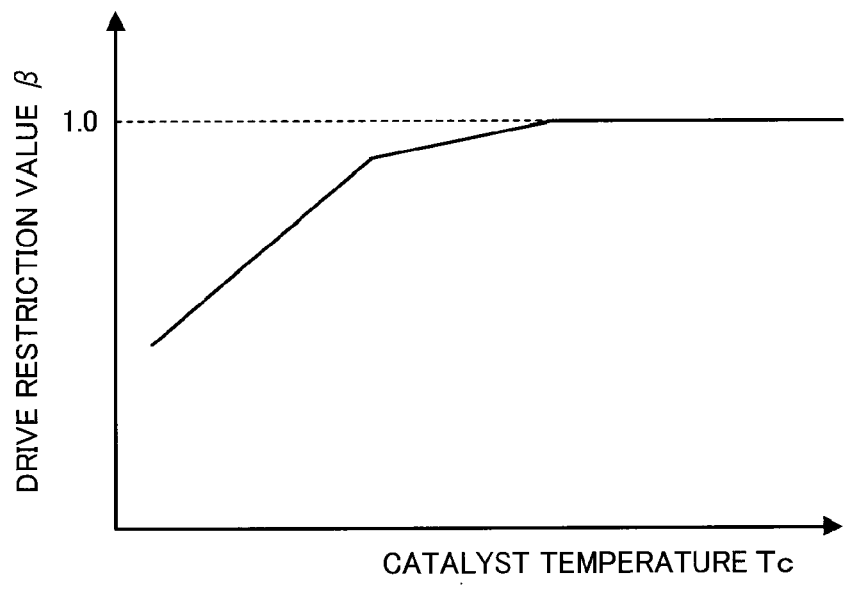
FIG. 11 shows one example of relation of a power restriction value β to a catalyst temperature Tc.
Figure 12:
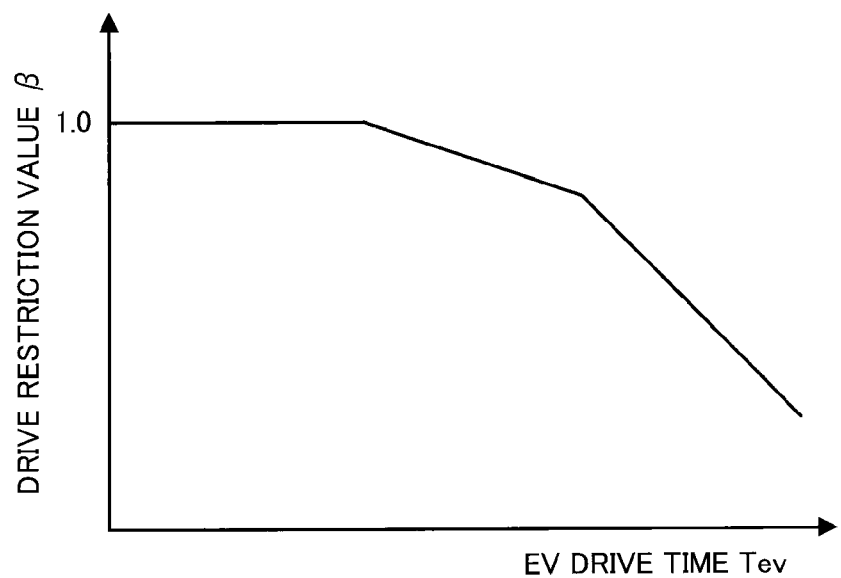
FIG. 12 shows one example of relation of the power restriction value β to an EV drive time Tev.

Upon identification of the drive restriction flag Ft equal to 0, it is determined whether the catalyst temperature Tc is lower than a preset reference temperature Tcref1 (step S320). When the catalyst temperature Tc is lower than the reference temperature Tcref1, the CPU 72 sets the drive restriction flag Ft to 1 (step S330), and sets a drive restriction value β based on the input catalyst temperature Tc and the input EV drive time Tev (step S340). The reference temperature Tcref1 used as the criterion in the second embodiment is identical with the reference temperature Tcref1 used in the first embodiment. The drive restriction value β represents a correction factor to be multiplied to an allowable torque Tmax as a maximum value of the torque demand Tr* set according to the vehicle speed V with a view to restricting the torque to be output to the ring gear shaft 32a or the driveshaft. The drive restriction value β is set in a value range of 0 to 1 and decreases with a decrease in catalyst temperature Tc and with an increase in EV drive time Tev. A concrete procedure of setting the drive restriction value β in the second embodiment provides and stores in advance a variation in drive restriction value β against the catalyst temperature Tc and a variation in drive restriction value β against the EV drive time Tev as a drive restriction value setting map in the ROM 74 and reads the drive restriction value β corresponding to the given catalyst temperature Tc and the given EV drive time Tev from this map. One example of the relation of the drive restriction value β to the catalyst temperature Tc is shown in FIG. 11, and one example of the relation of the drive restriction value β to the EV drive time Tev is shown in FIG. 12. In the first cycle of the drive control routine immediately after a start of the engine 22, the drive restriction value β is set equal to 1 representing no drive restriction as an initial value. The catalyst temperature Tc is subsequently compared with a preset reference temperature Tcref2 that is set to be slightly higher than the reference temperature Tcref1 (for example, higher by about 50° C.) (step S350). When the catalyst temperature Tc is lower than the reference temperature Tcref2, the CPU 72 sets a tentative torque demand Trtmp to the torque demand Tr* read corresponding to the input accelerator opening Acc and the input vehicle speed V from the torque demand setting map of FIG. 6, while setting the allowable torque Tmax to the torque demand Tr* read corresponding to the input vehicle speed V at a fixed accelerator opening Acc of 100% from the torque demand setting map of FIG. 6 (step S380). The smaller between the tentative torque demand Trtmp and the product of the allowable torque Tmax and the drive restriction value β is set to a torque demand Tr* (step S390). An engine power demand Pe* required for the engine 22 is then calculated as the sum of the product of the set torque demand Tr* and the rotation speed Nr of the ring gear shaft 32a, a charge-discharge power demand Pb* to be charged into or discharged from the battery 50, and a potential loss (step S395). The drive control routine performs the processing of steps S400 to S450 with the set engine power demand Pe* and is terminated. The processing of steps S400 to S450 is equivalent to the processing of steps S200 to S250 in the drive control routine of FIG. 3. In subsequent cycles of the drive control routine, until the catalyst temperature Tc increases to or above the reference temperature Tcref2, the operation control of the engine 22 and the motors MG1 and MG2 is performed with the torque demand Tr* set under the drive restriction with the drive restriction value β set according to the catalyst temperature Tc and the EV drive time immediately after a start of the engine 22. When the catalyst 134a has the significantly low catalyst temperature Tc and is expected to have only the poor catalyst performance immediately after a start of the engine 22 accompanied with a change from the motor drive to the hybrid drive, the torque demand Tr* to be output to the ring gear shaft 32a or the driveshaft is set with the drive restriction. The operation control of the engine 22 and the motors MG1 and MG2 is then performed with this torque demand Tr*. Such drive control of setting the torque demand Tr* with the drive restriction and performing the operation control of the engine 22 and the motors MG1 and MG2 with the torque demand Tr* effectively prevents the poor emission compared with the conventional drive control of setting the torque demand Tr* without imposing the drive restriction and performing the operation control of the engine 22 and the motors MG1 and MG2 with the torque demand Tr*, while ensuring the good vehicle driving performance compared with the simple catalyst warm-up operation of the engine 22.

When the catalyst temperature Tc reaches or exceeds the reference temperature Tcref2 through the repeated operation control of the engine 22 and the motors MG1 and MG2 with the torque demand Tr* under the drive restriction, the CPU 72 resets the drive restriction flag Ft to 0 (step S360) and sets the drive restriction value β to 1 (step S370). The drive control routine subsequently performs the processing of and after step S380 with the drive restriction value β set equal to 1 and is terminated. In this state, ordinary drive control starts in release of the drive restriction that is triggered by the temperature decrease of the catalyst 134a below the lower limit temperature in the specific temperature range of ensuring the sufficient catalyst performance. This arrangement promptly ensures the good vehicle driving performance without causing the poor emission. On the condition of the sufficient high catalyst temperature Tc of the catalyst 134a immediately after a start of the engine 22, that is, when the catalyst temperature Tc is not lower than the reference temperature Tcref1 in the first cycle of the drive control routine after a start of the engine 22, the torque demand Tr* is set with the drive restriction value β set to the initial value 1 representing no drive restriction. The processing of and after step S380 is then performed with this torque demand Tr* to control the operations of the engine 22 and the motors MG1 and MG2.

In the hybrid vehicle 20B of the second embodiment described above, when the catalyst 134a has the significantly low catalyst temperature Tc and is expected to have only the poor catalyst performance immediately after a start of the engine 22 accompanied with a change from the motor drive to the hybrid drive, the torque demand Tr* is set with the drive restriction. The operation control of the engine 22 and the motors MG1 and MG2 is then performed with this torque demand Tr*. Such drive control with the drive restriction effectively prevents the poor emission compared with the conventional drive control without imposing the drive restriction, while ensuring the good vehicle driving performance compared with the simple catalyst warm-up operation of the engine 22. The drive restriction is imposed with the drive restriction value β set according to the catalyst temperature Tc and the EV drive time Tev. This arrangement ensures the adequate drive restriction based on the catalyst temperature Tc and the EV drive time Tev. When the catalyst temperature Tc reaches or exceeds the reference temperature Tcref2 through the repeated operation control of the engine 22 and the motors MG1 and MG2 with the torque demand Tr* set under the drive restriction, there is no poor emission. The operation control of the engine 22 and the motors MG1 and MG2 (ordinary drive control) is then performed with the engine power demand Pe* set in release of the drive restriction. This arrangement promptly ensures the good vehicle driving performance without causing the poor emission. When the temperature of the catalyst 134a is in the specific temperature range of ensuring the sufficient catalyst performance immediately after a start of the engine 22 accompanied with a change from the motor drive to the hybrid drive, there is no poor emission. The torque demand Tr* is accordingly set without imposing the drive restriction, and the operation control of the engine 22 and the motors MG1 and MG2 is performed with this torque demand Tr*. This arrangement ensures the good vehicle driving performance without causing the poor emission.

In the hybrid vehicle 20B of the second embodiment, the drive restriction value β is set according to both the catalyst temperature Tc and the EV drive time Tev. The drive restriction value β may alternatively be set according to only the catalyst temperature Tc or according to only the EV drive time Tev. The drive restriction value β may otherwise be set to a fixed value (for example, 0.7), independently of the catalyst temperature Tc and the EV drive time Tev.

In the hybrid vehicle 20B of the second embodiment, the drive restriction is imposed with setting the smaller between the tentative torque demand Trtmp and the product of the allowable torque Tmax2, which represents the torque demand Tr* read corresponding to the vehicle speed V at the fixed accelerator opening Acc of 100% from the torque demand setting map of FIG. 6, and the drive restriction value β to the torque demand Tr*. The drive restriction may be imposed with setting the product of the value of the torque demand Tr* read corresponding to the accelerator opening Acc and the vehicle speed V from the torque demand setting map of FIG. 6 and the drive restriction value β to the torque demand Tr*.

In the hybrid vehicle 20B of the second embodiment, the drive restriction is imposed with the drive restriction value β when the catalyst temperature Tc detected immediately after a start of the engine 22 accompanied with a change from the motor drive to the hybrid drive is lower than the reference temperature Tcref1. The drive restriction is released when the subsequently detected catalyst temperature Tc reaches or exceeds the reference temperature Tcref2. In one modification, the drive restriction may be released after elapse of a preset time (for example, 1 minute or 2 minutes) since the start of the drive restriction.

In the hybrid vehicle 20 of the second embodiment, the drive restriction is imposed with the drive restriction value β when the catalyst temperature Tc detected immediately after a start of the engine 22 accompanied with a change from the motor drive to the hybrid drive is lower than the reference temperature Tcref1. The drive restriction is released when the subsequently detected catalyst temperature Tc reaches or exceeds the reference temperature Tcref2. In one modified configuration of the hybrid vehicle, a motor drive switch for giving an instruction of the motor drive may be provided in the neighborhood of the driver's seat. In an ON condition of the motor drive switch, the drive restriction is imposed with the drive restriction value β when the catalyst temperature Tc detected immediately after a start of the engine 22 accompanied with a change from the motor drive to the hybrid drive is lower than the reference temperature Tcref1. The drive restriction is released when the subsequently detected catalyst temperature Tc reaches or exceeds the reference temperature Tcref2. In an OFF condition of the motor drive switch, the output restriction with the drive restriction value β is not performed, irrespective of the catalyst temperature Tc detected immediately after a start of the engine 22 accompanied with a change from the motor drive to the hybrid drive.

Figure 13:
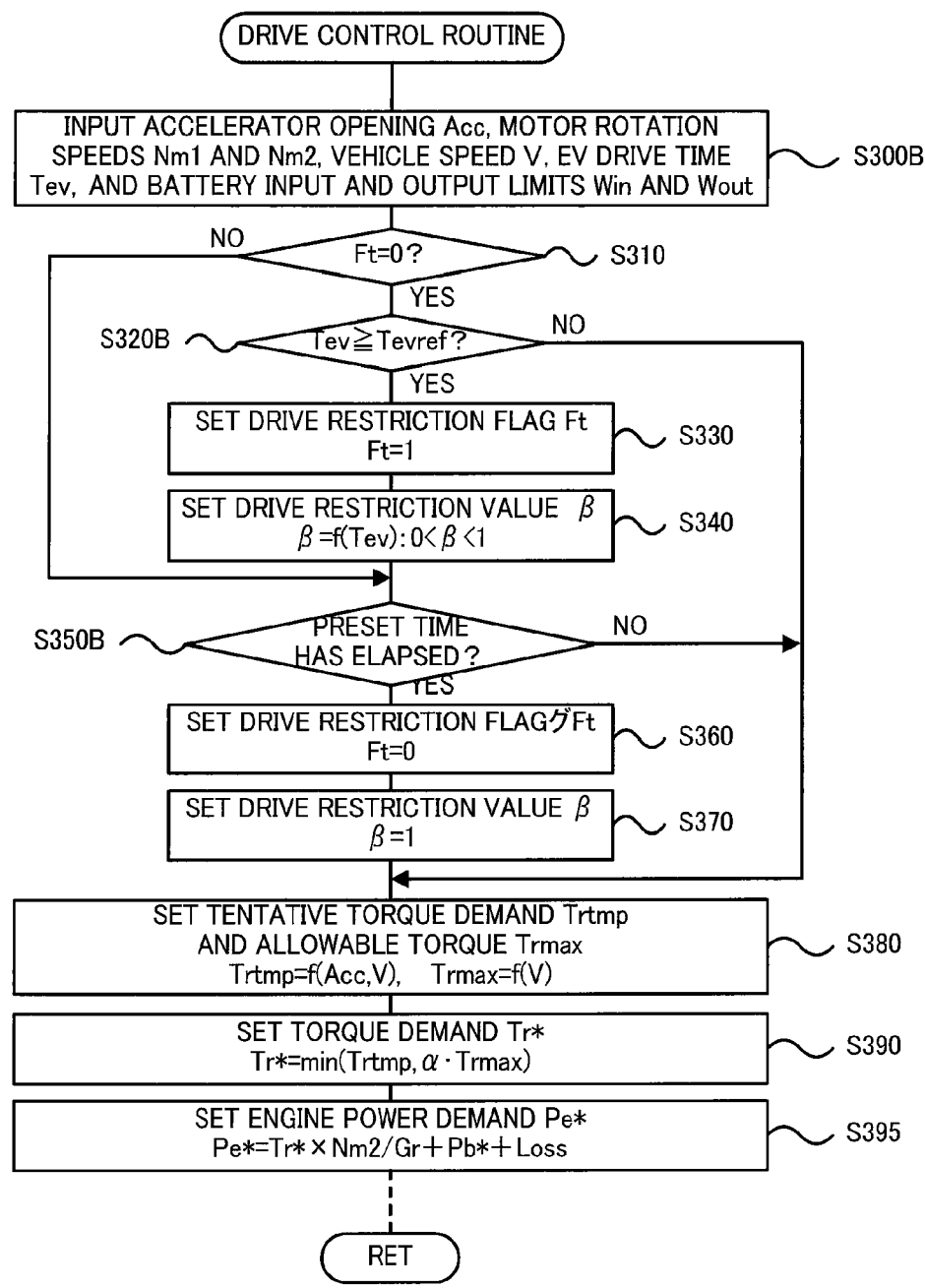
FIG. 13 is a flowchart showing a modified drive control routine.

In the hybrid vehicle 20B of the second embodiment, the catalytic converter 134 is equipped with the catalyst temperature sensor 134b. The drive restriction is imposed with the drive restriction value β when the catalyst temperature Tc detected by the catalyst temperature sensor 134b immediately after a start of the engine 22 accompanied with a change from the motor drive to the hybrid drive is lower than the reference temperature Tcref1. The drive restriction is released when the catalyst temperature Tc subsequently detected by the catalyst temperature sensor 134b reaches or exceeds the reference temperature Tcref2. The hybrid vehicle of one modified configuration may not have the catalyst temperature sensor 134b and may impose the drive restriction with the drive restriction value β according to the EV drive time Tev and release the drive restriction according to a time elapsed since the start of the drive restriction. In the hybrid vehicle of this modified configuration, a modified drive control routine of FIG. 13 is performed in place of the drive control routine of FIG. 10. The modified drive control routine of FIG. 13 inputs the similar data required for control except the catalyst temperature Tc (step S300B) and compares the input EV drive time Tev with a preset reference time Tevref (for example, 3 minutes or 4 minutes) (step S320B) upon identification of the drive restriction flag Ft equal to 0. When the EV drive time Tev is not longer than the reference time Tevref, it is assumed that the catalyst 134a is in the state of poor catalyst performance. The modified drive control routine then sets the drive restriction value β according to the EV drive time Tev (steps S330 and S340) and performs the operation control of the engine 22 and the motors MG1 and MG2 with the torque demand Tr* set under the drive restriction. It is then determined whether a preset time (for example, 1 minute or 2 minutes) has been elapsed since the start of the drive restriction (step S350B). On elapse of the preset time, it is assumed that the catalyst 134a is in the state of sufficient catalyst performance. The modified drive control routine then releases the drive restriction (steps S360 and S370) and performs the operation control of the engine 22 and the motors MG1 and MG2 (ordinary drive control) with the torque demand Tr* without imposing the drive restriction. This modified drive control is based on the fact that the longer EV drive time as the time duration of the motor drive results in decreasing the catalyst temperature Tc of the catalyst 134a. This modified arrangement also prevents the poor emission and ensures the good vehicle driving performance.

In the hybrid vehicles 20 and 20B of the first and the second embodiments, the catalyst temperature Tc is directly detected by the catalyst temperature sensor 134b. The catalyst temperature Tc may be estimated from the temperature of the exhaust gas of the engine 22 or from the operating condition of the engine 22.

Figure 14:
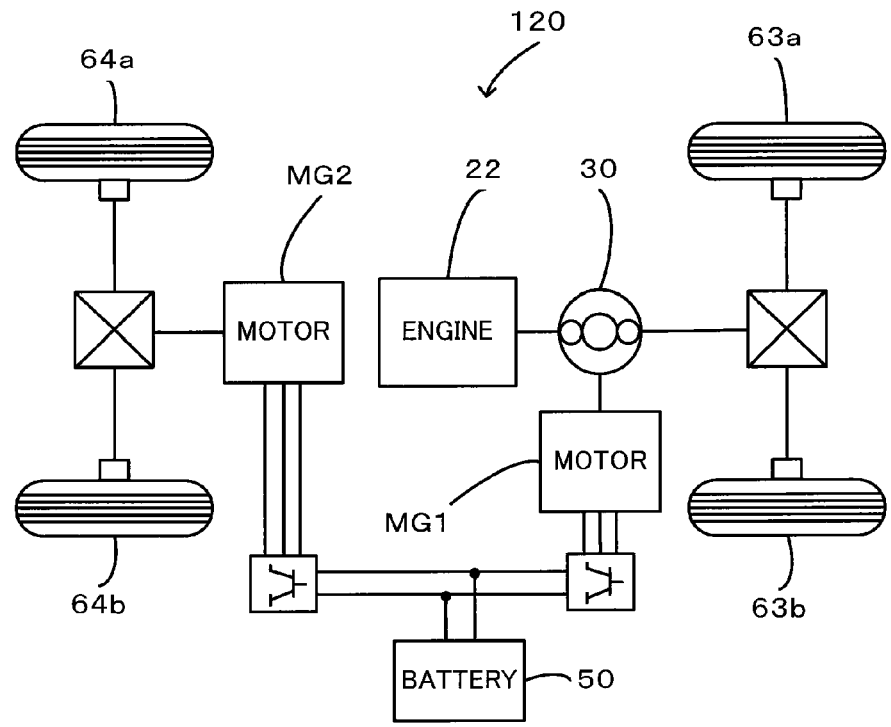
FIG. 14 schematically illustrates the configuration of a hybrid vehicle 120 in one modified structure.

In the hybrid vehicles 20 and 20B of the first and the second embodiments, the power of the motor MG2 is subjected to speed reduction by the reduction gear 35 and is output to the ring gear shaft 32a. The technique of the invention is, however, not restricted to the hybrid vehicles of this configuration but is also applicable to a hybrid vehicle 120 of a modified configuration shown in FIG. 14. In the hybrid vehicle 120 of FIG. 14, the power of the motor MG2 is connected to another axle (an axle linked with wheels 64a and 64b) that is different from an axle connecting with the ring gear shaft 32a (an axle linked with the drive wheels 63a and 63b).

Figure 15:
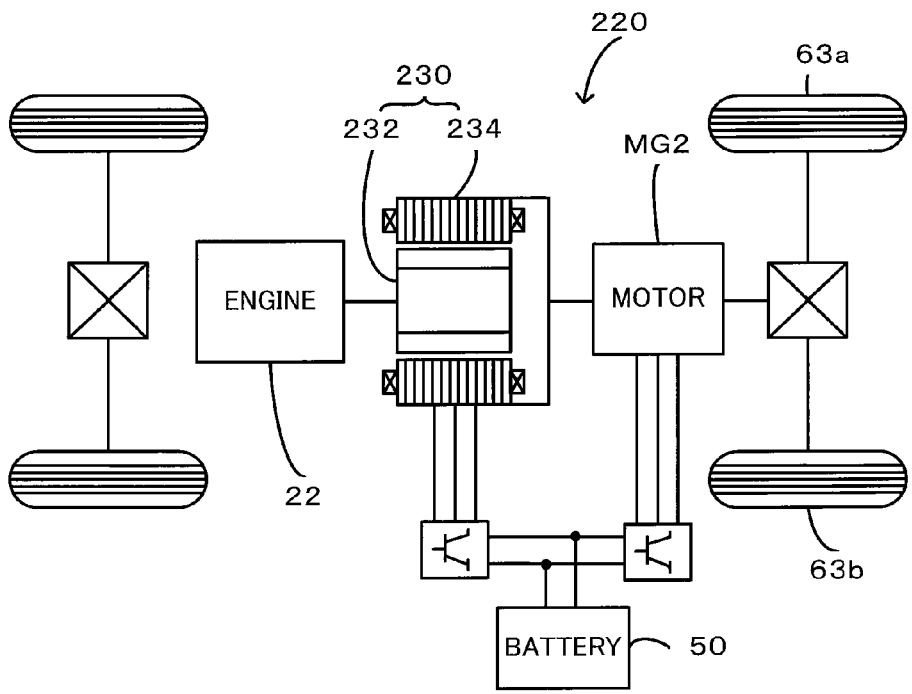
FIG. 15 schematically illustrates the configuration of a hybrid vehicle 220 in another modified structure.

In the hybrid vehicles 20 and 20B of the first and the second embodiments, the power of the engine 22 is output via the power distribution integration mechanism 30 to the ring gear shaft 32a or the driveshaft linked with the drive wheels 63a and 63b. The technique of the invention is, however, not restricted to the hybrid vehicles of this configuration but is also applicable to a hybrid vehicle 220 of another modified configuration shown in FIG. 15. The hybrid vehicle 220 of FIG. 15 is equipped with a pair-rotor motor 230. The pair-rotor motor 230 includes an inner rotor 232 connected to the crankshaft 26 of the engine 22 and an outer rotor 234 connected to a driveshaft for outputting power to drive wheels 63a and 63b. The pair-rotor motor 230 transmits part of the output power of the engine 22 to the driveshaft, while converting the residual engine output power into electric power.

The above embodiments and modified examples describe the applications of the invention to the hybrid vehicles of the specific configurations. The technique of the invention may generally be actualized by a hybrid vehicle of any configuration driven with output power of a motor and with output power of an internal combustion engine equipped with a catalytic converter located in an exhaust pipe and filled with a catalyst having capacity for reducing the toxicity of exhaust gas, as well as by a control method of such a hybrid vehicle.

The primary elements in the embodiments and their modified examples are mapped to the primary constituents in the claims of the invention as described below. In the configuration of the first embodiment, the engine 22 equipped with the catalytic converter 134 located in the exhaust pipe and filled with the catalyst 134a corresponds to the 'internal combustion engine' in the claims of the invention. The motor MG2 arranged to output the driving power via the reduction gear 35 to the ring gear shaft 32a or the driveshaft corresponds to the 'motor' in the claims of the invention. The hybrid electronic control unit 70 executing the processing of step S180 to set the torque demand Tr* corresponding to the accelerator opening Acc and the vehicle speed V in the drive control routine of FIG. 3 is equivalent to the 'driving force demand setting module' in the claims of the invention. The hybrid electronic control unit 70 executing the processing of steps S110 to S190 in the drive control routine of FIG. 3 is equivalent to the 'target power setting module' in the claims of the invention. The processing of steps S110 to S190 sets the engine power demand Pe* without imposing the output restriction when the temperature Tc of the catalyst 134a is in the specific temperature range of ensuring the sufficient catalyst performance immediately after a start of the engine 22 accompanied with a change from the motor drive to the hybrid drive, while setting the engine power demand Pe* with imposing the output restriction when the temperature Tc of the catalyst 134a decreases to be out of the specific temperature range of ensuring the sufficient catalyst performance immediately after a start of the engine 22 accompanied with a change from the motor drive to the hybrid drive. The processing of steps S110 to S190 releases the output restriction and sets the engine power demand Pe* without imposing the output restriction when the catalyst temperature Tc reaches or exceeds the preset reference temperature Tcref2 through the repeated operation control of the engine 22 and the motors MG1 and MG2 with the engine power demand Pe* under the output restriction. The hybrid electronic control unit 70 executing the motor drive routine (not shown) and the processing of steps S200 to S250 in the drive control routine of FIG. 3, in combination with the engine ECU 24 controlling the operations of the engine 22 in response to control signals from the hybrid electronic control unit 70 and the motor ECU 40 controlling the operations of the motors MG1 and MG2 in response to control signals from the hybrid electronic control unit 70 is equivalent to the 'controller' in the claims of the invention. The motor drive routine is performed in the state of the operation stop of the engine 22 and controls the engine 22 and the motors MG1 and MG2 to ensure output of the torque demand Tr*, which is set based on the accelerator opening Acc and the vehicle speed V according to the torque demand setting map of FIG. 6, from the motor MG2 to the ring gear shaft 32a or the driveshaft. The processing of steps S200 to S250 is performed in the state of the operation of the engine 22 and controls the engine 22 and the motors MG1 and MG2 to output the engine power demand Pe* from the engine 22 and ensure output of the torque demand Tr* to the ring gear shaft 32a or the driveshaft within the range of the input limit Win and the output limit Wout of the battery 50.

Figure 10:
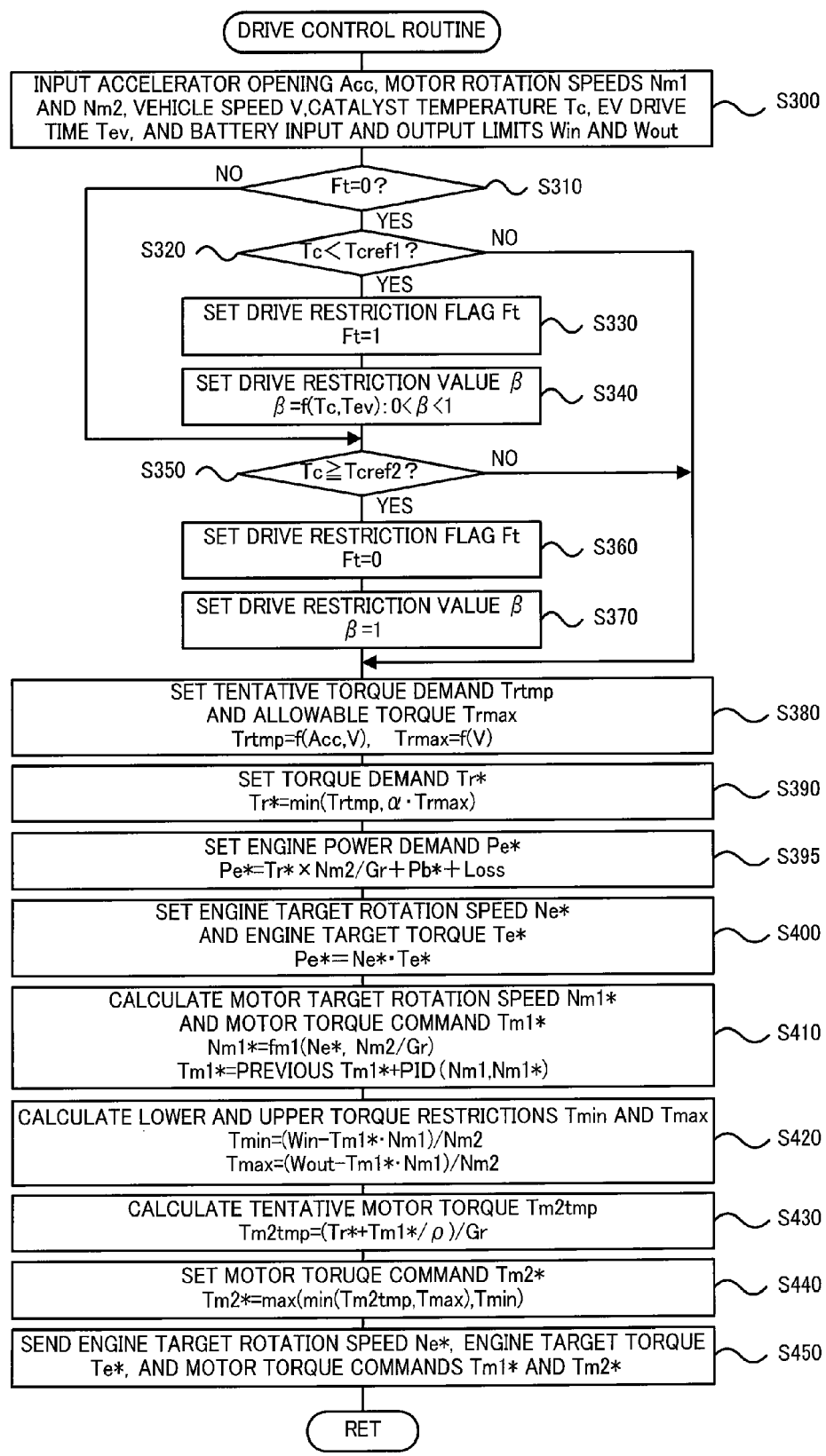
FIG. 10 is a flowchart showing a drive control routine executed by a hybrid electronic control unit 70 in a second embodiment.

In the configuration of the second embodiment, the engine 22 equipped with the catalytic converter 134 located in the exhaust pipe and filled with the catalyst 134a corresponds to the 'internal combustion engine' in the claims of the invention. The motor MG2 arranged to output the driving power via the reduction gear 35 to the ring gear shaft 32a or the driveshaft corresponds to the 'motor' in the claims of the invention. The hybrid electronic control unit 70 executing the processing of steps S310 to S390 in the drive control routine of FIG. 10 is equivalent to the 'driving force demand setting module' in the claims of the invention. The processing of steps S310 to S390 sets the torque demand Tr* based on the accelerator opening Acc and the vehicle speed V without imposing the drive restriction when the temperature Tc of the catalyst 134a is in the specific temperature range of ensuring the sufficient catalyst performance immediately after a start of the engine 22 accompanied with a change from the motor drive to the hybrid drive, while setting the torque demand Tr* with imposing the drive restriction with the drive restriction value β set according to the catalyst temperature Tc and the EV drive time Tev when the temperature Tc of the catalyst 134a decreases to be out of the specific temperature range of ensuring the sufficient catalyst performance immediately after a start of the engine 22 accompanied with a change from the motor drive to the hybrid drive. The processing of steps S310 to S390 releases the drive restriction and sets the torque demand Tr* without imposing the drive restriction when the catalyst temperature Tc reaches or exceeds the preset reference temperature Tcref2 through the repeated operation control of the engine 22 and the motors MG1 and MG2 with the torque demand Tr* under the drive restriction. The hybrid electronic control unit 70 executing the processing of steps S395 to S450 in the drive control routine of FIG. 10, in combination with the engine ECU 24 controlling the operations of the engine 22 in response to control signals from the hybrid electronic control unit 70 and the motor ECU 40 controlling the operations of the motors MG1 and MG2 in response to control signals from the hybrid electronic control unit 70 is equivalent to the 'controller' in the claims of the invention. The processing of steps S395 to S450 controls the engine 22 and the motors MG1 and MG2 to ensure output of the torque demand Tr* in the range of the input limit Win and the output limit Wout of the battery 50 to the ring gear shaft 32a or the driveshaft with the intermittent operation of the engine 22. The combination of the motor MG1 and the power distribution integration mechanism 30 in the embodiments or the pair-rotor motor 230 in the modified example is equivalent to the 'electric power-mechanical power input output assembly' in the claims of the invention. The power distribution integration mechanism 30 in the embodiments corresponds to the 'three shaft-type power input output structure' in the claims of the invention. The motor MG1 in the embodiments corresponds to the 'generator' in the claims of the invention.

The above mapping of the primary elements in the embodiments and their modified examples to the primary constituents in the claims of the invention is not restrictive in any sense but is only illustrative for concretely describing the modes of carrying out the invention. Namely the embodiments and their modified examples discussed above are to be considered in all aspects as illustrative and not restrictive.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The technique of the present invention is preferably applied to the manufacturing industries of hybrid vehicles.

The invention claimed is:

1. A hybrid vehicle driven with output power of a motor and with output power of an internal combustion engine equipped with a catalytic converter located in an exhaust pipe and filled with a catalyst having a capacity for reducing the toxicity of exhaust gas, the hybrid vehicle comprising:
   a driving force demand setting module configured to set a driving force demand required for driving the hybrid vehicle;
   a target power setting module configured to, when a catalyst temperature decrease condition of decreasing temperature of the catalyst is not satisfied on a restart of operation of the internal combustion engine or on an engine operation restart after a motor drive of the hybrid vehicle driven with only the output power of the motor in a state of operation stop of the internal combustion engine, set a target power to be output from the internal combustion engine based on the set driving force demand,
   when the catalyst temperature decrease condition is satisfied on the engine operation restart, the target power setting module setting the target power to be output from the internal combustion engine based on the set driving force demand with a predetermined output restriction, until fulfillment of a specified return condition,
   after fulfillment of the specified return condition, the target power setting module releasing the predetermined output restriction and setting the target power to be output from the internal combustion engine based on the set driving force demand; and
   a controller configured to, in the state of operation stop of the internal combustion engine, control the internal combustion engine and the motor to drive the hybrid vehicle with a driving force equivalent to the set driving force demand with the internal combustion engine kept stopping,
   in a state of operation of the internal combustion engine, the controller controlling the internal combustion engine and the motor to cause the set target power to be output from the internal combustion engine and to drive the hybrid vehicle with the driving force equivalent to the set driving force demand.

2. The hybrid vehicle in accordance with claim 1, the hybrid vehicle further having:
   a motor drive switch located near to a driver's seat of the hybrid vehicle and operated to give an instruction for the motor drive,
   wherein on the engine operation restart in an off condition of the motor drive switch, the target power setting module sets the target power to be output from the internal combustion engine based on the set driving force demand, irrespective of fulfillment or failure of the catalyst temperature decrease condition.

3. The hybrid vehicle in accordance with claim 1, wherein the predetermined output restriction has a tendency of imposing a stronger restriction with a decrease in temperature of the catalyst.

4. The hybrid vehicle in accordance with claim 1, wherein the predetermined output restriction has a tendency of imposing a stronger restriction with an increase in time duration of the motor drive immediately before a restart of the operation of the internal combustion engine.

5. The hybrid vehicle in accordance with claim 1, wherein the predetermined output restriction imposes a restriction on an upper limit of power output from the internal combustion engine.

6. The hybrid vehicle in accordance with claim 1, wherein the catalyst temperature decrease condition is that the temperature of the catalyst is lower than a first temperature, and
the specified return condition is that the temperature of the catalyst is not lower than a second temperature that is higher than the first temperature.

7. The hybrid vehicle in accordance with claim 1, wherein the catalyst temperature decrease condition is that the motor drive continues for or over a first time period, and
the specified return condition is that a second time period has elapsed or a predetermined distance has been driven since a restart of the operation of the internal combustion engine.

8. The hybrid vehicle in accordance with claim 1, the hybrid vehicle further having:
an electric power-mechanical power input output assembly connected with a driveshaft linked to an axle of the hybrid vehicle and with an output shaft of the internal combustion engine in such a manner as to be rotatable independently of the driveshaft and configured to input and output power to and from the driveshaft and the internal combustion engine through input and output of electric power and mechanical power.

9. The hybrid vehicle in accordance with claim 8, wherein the electric power-mechanical power input output assembly has:
a three shaft-type power input output structure connected to three shafts, the driveshaft, the output shaft, and a third shaft, and designed to input and output power to a residual shaft based on powers input from and output to any two shafts among the three shafts; and
a generator arranged to input and output power from and to the third shaft.

10. A hybrid vehicle driven with output power of a motor and with output power of an internal combustion engine equipped with a catalytic converter located in an exhaust pipe and filled with a catalyst having a capacity for reducing the toxicity of exhaust gas, the hybrid vehicle comprising:
a driving force demand setting module configured to, when a catalyst temperature decrease condition of decreasing temperature of the catalyst is not satisfied on a restart of operation of the internal combustion engine or on an engine operation restart after a motor drive of the hybrid vehicle driven with only the output power of the motor in a state of operation stop of the internal combustion engine, set a driving force demand required for driving the hybrid vehicle in a preset constraint,
when the catalyst temperature decrease condition is satisfied on the engine operation restart, the driving force demand setting module setting the driving force demand in the preset constraint with a predetermined output restriction, until fulfillment of a specified return condition,
after fulfillment of the specified return condition, the driving force demand setting module releasing the predetermined output restriction and setting the driving force demand in the preset constraint; and
a controller configured to control the internal combustion engine and the motor to drive the hybrid vehicle with a driving force equivalent to the set driving force demand accompanied with intermittent operation of the internal combustion engine.

11. The hybrid vehicle in accordance with claim 10, the hybrid vehicle further having:
a motor drive switch located near to a driver's seat of the hybrid vehicle and operated to give an instruction for the motor drive,
wherein on the engine operation restart in an off condition of the motor drive switch, the driving force demand setting module sets the driving force demand in the preset constraint, irrespective of fulfillment or failure of the catalyst temperature decrease condition.

12. The hybrid vehicle in accordance with claim 10, wherein the predetermined output restriction has a tendency of imposing a stronger restriction with a decrease in temperature of the catalyst.

13. The hybrid vehicle in accordance with claim 10, wherein the predetermined output restriction has a tendency of imposing a stronger restriction with an increase in time duration of the motor drive immediately before a restart of the operation of the internal combustion engine.

14. The hybrid vehicle in accordance with claim 10, wherein the predetermined output restriction imposes a restriction on an upper limit of power output from the internal combustion engine.

15. The hybrid vehicle in accordance with claim 10, wherein the catalyst temperature decrease condition is that the temperature of the catalyst is lower than a first temperature, and
the specified return condition is that the temperature of the catalyst is not lower than a second temperature that is higher than the first temperature.

16. The hybrid vehicle in accordance with claim 10, wherein the catalyst temperature decrease condition is that the motor drive continues for or over a first time period, and
the specified return condition is that a second time period has elapsed or a predetermined distance has been driven since a restart of the operation of the internal combustion engine.

17. The hybrid vehicle in accordance with claim 10, the hybrid vehicle further having:
an electric power-mechanical power input output assembly connected with a driveshaft linked to an axle of the hybrid vehicle and with an output shaft of the internal combustion engine in such a manner as to be rotatable independently of the driveshaft and configured to input and output power to and from the driveshaft and the internal combustion engine through input and output of electric power and mechanical power.

18. The hybrid vehicle in accordance with claim 17, wherein the electric power-mechanical power input output assembly has:
a three shaft-type power input output structure connected to three shafts, the driveshaft, the output shaft, and a third shaft, and designed to input and output power to a residual shaft based on powers input from and output to any two shafts among the three shafts; and
a generator arranged to input and output power from and to the third shaft.

19. A control method of a hybrid vehicle driven with output power of a motor and with output power of an internal combustion engine equipped with a catalytic converter located in an exhaust pipe and filled with a catalyst having a capacity for reducing the toxicity of exhaust gas, the control method comprising:
(a) when a catalyst temperature decrease condition of decreasing temperature of the catalyst is not satisfied on a restart of operation of the internal combustion engine or on an engine operation restart after a motor drive of the hybrid vehicle driven with only the output power of the motor in a state of operation stop of the internal combustion engine, setting a target power to be output from the internal combustion engine based on a driving force demand required for driving the hybrid vehicle, and when the catalyst temperature decrease condition is satisfied on the engine operation restart, setting the target power to be output from the internal combustion engine based on the driving force demand with a predetermined output restriction, until fulfillment of a specified return condition, and after fulfillment of the specified return condition, releasing the predetermined output restriction and setting the target power to be output from the internal combustion engine based on the driving force demand; and (b) in the state of operation stop of the internal combustion engine, controlling the internal combustion engine and the motor to drive the hybrid vehicle with a driving force equivalent to the driving force demand with the internal combustion engine kept stopping, while in a state of operation of the internal combustion engine, controlling the internal combustion engine and the motor to cause the set target power to be output from the internal combustion engine and to drive the hybrid vehicle with the driving force equivalent to the driving force demand.

20. A control method of a hybrid vehicle driven with output power of a motor and with output power of an internal combustion engine equipped with a catalytic converter located in an exhaust pipe and filled with a catalyst having a capacity for reducing the toxicity of exhaust gas, the control method comprising:

(a) when a catalyst temperature decrease condition of decreasing temperature of the catalyst is not satisfied on a restart of operation of the internal combustion engine or on an engine operation restart after a motor drive of the hybrid vehicle driven with only the output power of the motor in a state of operation stop of the internal combustion engine, setting a driving force demand required for driving the hybrid vehicle in a preset constraint, and when the catalyst temperature decrease condition is satisfied on the engine operation restart, setting the driving force demand in the preset constraint with a predetermined output restriction, until fulfillment of a specified return condition, and after fulfillment of the specified return condition, releasing the predetermined output restriction and setting the driving force demand in the preset constraint; and (b) controlling the internal combustion engine and the motor to drive the hybrid vehicle with a driving force equivalent to the set driving force demand accompanied with intermittent operation of the internal combustion engine.

* * * * *